(12) United States Patent
Taguchi et al.

(10) Patent No.: US 6,985,948 B2
(45) Date of Patent: Jan. 10, 2006

(54) USER'S RIGHT INFORMATION AND KEYWORDS INPUT BASED SEARCH QUERY GENERATING MEANS METHOD AND APPARATUS FOR SEARCHING A FILE

(75) Inventors: Katsuhiko Taguchi, Kawasaki (JP); Tatsuya Shindo, Kawasaki (JP); Kohtaro Egawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 09/753,427

(22) Filed: Jan. 3, 2001

(65) Prior Publication Data

US 2001/0027451 A1 Oct. 4, 2001

(30) Foreign Application Priority Data

Mar. 29, 2000 (JP) .................................. 2000-091366

(51) Int. Cl.
*G06F 15/173* (2006.01)
*G06F 3/00* (2006.01)

(52) U.S. Cl. ............... 709/225; 709/229; 715/741; 715/743

(58) Field of Classification Search ............... 709/203, 709/217–219, 225, 229; 713/182–186, 201; 715/741, 743; 711/163, 164, 150; 340/5.3–5.33, 340/5.74, 825; 707/1–5, 9; 710/36
See application file for complete search history.

(56) References Cited

U.S. PATENT DOCUMENTS

| | | | | | |
|---|---|---|---|---|---|
| 5,263,158 A | * | 11/1993 | Janis | ............................. | 707/1 |
| 5,680,614 A | * | 10/1997 | Bakuya et al. | .......... | 707/103 R |
| 5,721,906 A | * | 2/1998 | Siefert | ........................... | 707/9 |
| 5,819,092 A | * | 10/1998 | Ferguson et al. | ........... | 717/113 |
| 5,842,043 A | * | 11/1998 | Nishimura | .................. | 710/36 |
| 6,523,022 B1 | * | 2/2003 | Hobbs | .......................... | 707/3 |
| 6,599,324 B2 | * | 7/2003 | Saito et al. | ................ | 715/513 |
| 6,615,230 B2 | * | 9/2003 | Nishimura | .................. | 718/101 |

* cited by examiner

*Primary Examiner*—Beatriz Prieto
(74) *Attorney, Agent, or Firm*—Greer, Burns & Crain, Ltd.

(57) ABSTRACT

An information processing apparatus searches for documents with access rights created for them. A file information obtaining section obtains predetermined information from a file. A right information obtaining section obtains right information indicating a user who can access a file. An index storing section stores an index in which information obtained by the file information obtaining section is associated with right information obtained by the right information obtaining section. A keyword inputting section accepts keyword input for searching for a file. A user specifying section specifies a user who inputted a keyword. A search query generating section generates a search query from a keyword input from the keyword inputting section and information indicating a user specified by the user specifying section. A searching section searches the index storing section for an index corresponding to a search query generated by the search query generating section.

17 Claims, 43 Drawing Sheets

| Title | PROPOSAL |
|---|---|
| Body | WITH THE PROPAGATION OF INTERNET, THE MARKET IS GLOBALIZED INCREASINGLY… |
| ACL | taguchi |

FIG. 6

PRIOP ART

USER'S RIGHT INFORMATION AND KEYWORDS INPUT BASED SEARCH QUERY GENERATING MEANS METHOD AND APPARATUS FOR SEARCHING A FILE

BACKGROUND OF THE INVENTION (1) Field of the Invention

This invention relates to an information processing apparatus and, more particularly, to an information processing apparatus for performing a process for searching for a file stored in a memory.

(2) Description of the Related Art

The inverted index system is known as a method for searching text at high speed. In this method, words included in a document to be searched are extracted, data structure (inverted index) in which a document including a word can be looked up easily on the basis of the word is created (indexing) in advance, and a result (document including a particular word) is searched for at high speed by using that data structure at search time.

By the way, the rights of access (access rights) may be created for a document in order to permit a particular user alone to use it. If a document for which such access rights are created is searched for, only documents for which a user who made a request has access rights need to be displayed as search results. Otherwise he/she will see the number of documents for which he/she does not have access rights, which is not desirable from the viewpoint of security.

FIG. 43 is a view showing an example of an information processing apparatus for searching for a document for which such access rights are created.

As shown in FIG. 43, an information processing apparatus 1 comprises an indexer 1a, an index storing section 1b, a text searching engine 1c, and an access right filter 1d and searches a group of documents stored in a document store 2 for a document including a query input.

The indexer 1a generates an index by extracting necessary information from documents stored in the document store 2 in compliance with indexing conditions input and stores it in the index storing section 1b.

The index storing section 1b stores an index generated by the indexer 1a.

The text searching engine 1c searches the index storing section 1b for an index including a keyword supplied from a user.

The access right filter 1d specifies the original document in the document store 2 corresponding to an index searched for by the text searching engine 1c and obtains its access right information. The access right filter 1d selects only documents for which a user who searched has access rights and outputs them as search results.

The operation of the above example will now be described.

The indexer 1a searches documents stored in the document store 2 in a predetermined cycle and generates an index in compliance with indexing conditions, which are information for specifying the type of information obtained from documents and a method for obtaining it.

The indexer 1a obtains the title and body of each of documents stored in the document store 2 in compliance with these conditions and generates an index. As a result, an index corresponding to each of documents stored in the document store 2 will be stored in the index storing section 1b.

In this state of things, it is assumed that a user supplies keyword "(Title=Proposal)&(Body=Internet)" to the text searching engine 1c. The text searching engine 1c searches the index storing section 1b for an index which includes input keyword in each of its title and body, and supplies the search result to the access right filter 1d.

The access right filter 1d inputs user information (user ID, for example) necessary for specifying a user. Then the access right filter 1d specifies the original document in the document store 2 corresponding to an index given as the search result and checks by comparing its right information and the user information whether or not the user has access rights for the document. If the user has access rights, then the access right filter 1d outputs the title of the document as the search result.

The above processes will enable to refer to right information given to each document and to output only information for which a user has access rights as search results.

By the way, a striking feature of a full text search with an inverted index described above is great speed. However, in a filtering system in which an inquiry about access rights is made for each of documents included in a list obtained as a search result, filtering will take time, which makes great speed in search meaningless.

In addition, a full text search with an inverted index outputs "the number of hits," being the number of documents which meet a condition imposed by a search query, as search results. The conventional method described above, however, cannot calculate the number of really valid hits (based on access rights) before a filtering process. Therefore, when the number of hits before a filtering process reaches hundreds of thousands or millions, a filtering process takes a very long time. As a result, it takes much time to display the number of hits.

SUMMARY OF THE INVENTION

In order to address such a problem, the present invention was made. In other words, an object of the present invention is to provide an information processing apparatus that can search for information at high speed.

In order to achieve the above object, an information processing apparatus for performing a process for searching for a file stored in a memory is provided. This information processing apparatus comprises file information obtaining means for obtaining predetermined information from the file, right information obtaining means for obtaining right information indicating a user who can access the file, index storing means for storing an index in which information obtained by the file information obtaining means is associated with right information obtained by the right information obtaining means, keyword inputting means for accepting keyword input for searching for the file, user specifying means for specifying a user who input the keyword, search query generating means for generating a search query from a keyword input from the keyword inputting means and information indicating a user specified by the user specifying means, and searching means for searching the index storing means for an index corresponding to a search query generated by the search query generating means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is an example of an index generated by the procedure shown in FIG. 5;

DESCRIPTION OF THE PREFERRED EMBODIMENTS

An embodiment of the present invention will now be described with reference to the drawings.

Figure 1:
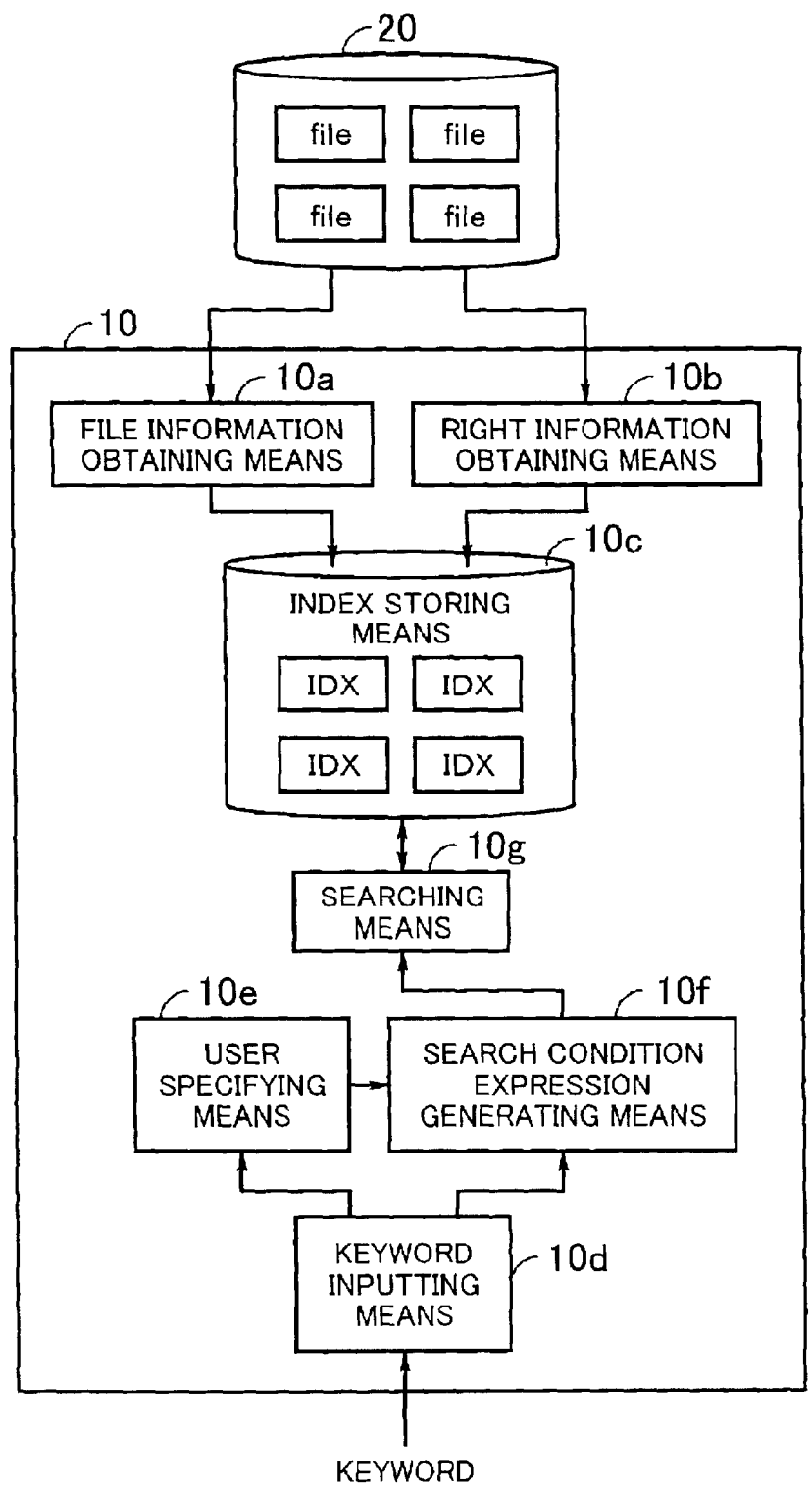
FIG. 1 is a view for describing the operating principle of the present invention.

FIG. 1 is a view for describing the operating principle of the present invention. In FIG. 1, an information processing apparatus 10 according to the present invention comprises file information obtaining means 10a, right information obtaining means 10b, index storing means 10c, keyword inputting means 10d, user specifying means 10e, search query generating means 10f, and searching means 10g and searches files stored in a memory 20 for one including a keyword input.

It should be understood that "file" in this specification includes a wide range of information, such as text and an image.

The file information obtaining means 10a obtains, for example, a title and body as file information from each of files stored in the memory 20. In this example the file information obtaining means 10a obtains the full text of a file, but it may obtain, for example, only keywords included in a body.

The right information obtaining means 10b obtains right information indicating a user who can access each file from the memory 20. Right information in this example is information for giving access rights to a particular user or group and information for giving access rights to all users.

The index storing means 10c generates an index from file information obtained by the file information obtaining means 10a and right information obtained by the right information obtaining means 10b and stores it.

The keyword inputting means 10d accepts keyword input for specifying a predetermined file.

The user specifying means 10e specifies a user on the basis of information for specifying a user, such as a user ID and password input for authentication, for example when the user logs in a system.

The search query generating means 10f generates a search query from a keyword input from the keyword inputting means 10d and information regarding a user specified by the user specifying means 10e.

The searching means log searches the index storing means 10c for an index corresponding to a search query generated by the search query generating means 10f.

The memory 20 consists of, for example, a file server and stores a plurality of files with access rights for them.

Now, operation in FIG. 1 will be described.

It is assumed that the memory 20 stores a plurality of files. When the process of generating an index is started, first the file information obtaining means 10a obtains a file from the memory 20 and then obtains the title and body of the file.

Next, the right information obtaining means 10b obtains right information indicating a user who is permitted to access the file from the file from which the file information obtaining means 10a obtained file information.

File information and right information obtained in this way are supplied to the index storing means 10c. The index storing means 10c associates file information with right information for each file and stores the result as an index. As a result, an index corresponding to each of files stored in the memory 20 is generated and stored in the index storing means 10c.

When a predetermined user makes a request to search after indexes being stored in the index storing means 10c in this way, a searching process will be performed.

In a searching process, first a user inputs a predetermined keyword from the keyword inputting means 10d. In this case, the user specifying means 10e specifies a user who input the keyword on the basis of a user ID and password input at the time of the user logging in.

The search query generating means 10f generates a search query from a keyword input from the keyword inputting means 10d and information indicating a user specified by the user specifying means 10e. To be concrete, if a specified user is "TANAKA" and a keyword is "communication," then the search query generating means 10f generates a search query for searching for a file which includes keyword "communication" and which "TANAKA" is permitted to access.

The searching means 10g searches the index storing means 10c for an index corresponding to a search query generated by the search query generating means 10f. The search results are listed on, for example, a display device (not shown).

As described above, the information processing apparatus 10 according to the present invention generates an index in which not only file information but also right information are associated with a file, and searches on the basis of it. This enables to search for a file at high speed with right information taken into consideration.

Now, an embodiment of the present invention will be described.

Figure 2:
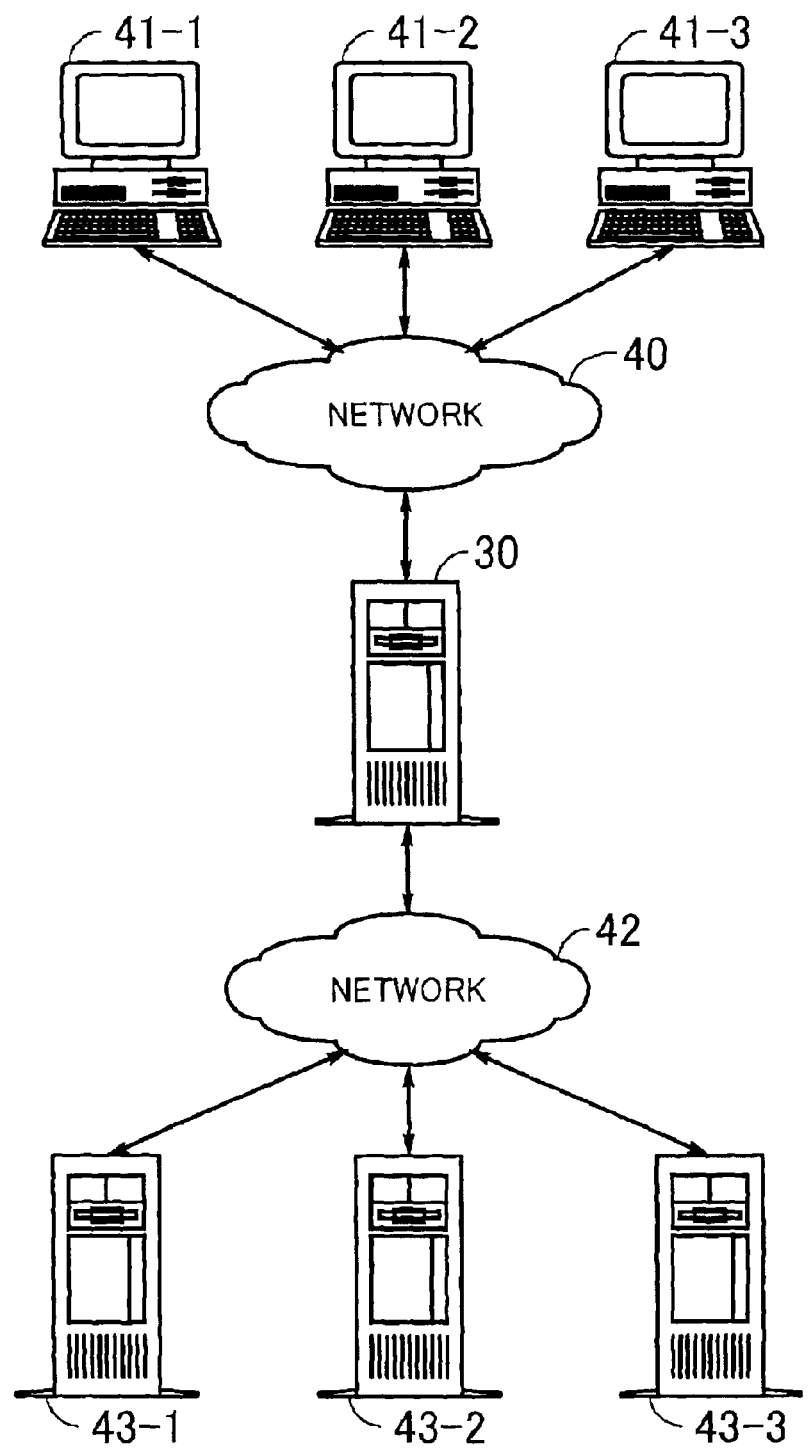
FIG. 2 is a view showing the configuration of a system including an information processing apparatus according to the present invention.

FIG. 2 is a view showing the configuration of the whole of a system including an information processing apparatus 30 according to the present invention.

In FIG. 2, the information processing apparatus 30 consists of, for example, workstations, mainframes, etc., generates an index from files stored in servers 43-1 through 43-3, and displays a list of documents in response to requests to search from clients 41-1 through 41-3. The detailed configuration of the information processing apparatus 30 will be described later.

Networks 40 and 42 consist of, for example, Internet, a local area network (LAN), etc. The networks 40 and 42 may have the same physical configuration.

The clients 41-1 through 41-3 consist of, for example, a personal computer, make a request to search for information to the information processing apparatus 30, and displays results obtained.

The servers 43-1 through 43-3 store documents, read out a document or right information in response to a request from the information processing apparatus 30, and supply it.

Figure 3:
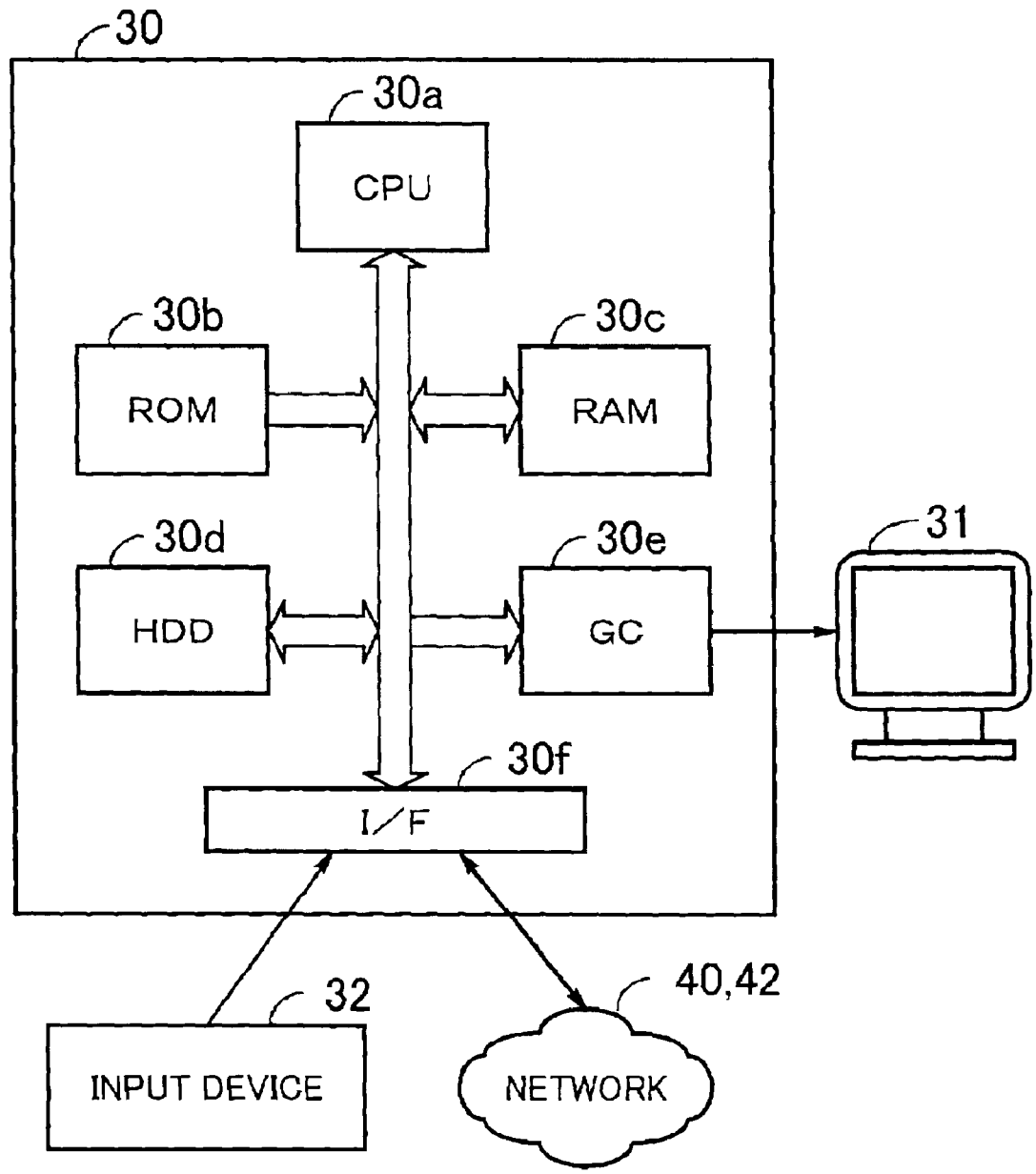
FIG. 3 is a block diagram showing the configuration of an embodiment of the present invention.

FIG. 3 is a block diagram showing the detailed configuration of the information processing apparatus 30 shown in FIG. 2. As shown in FIG. 3, the information processing apparatus 30 comprises a central processing unit (CPU) 30a, a read only memory (ROM) 30b, a random access memory (RAM) 30c, a hard disk drive (HDD) 30d, a graphics card (GC) 30e, and an interface (I/F) 30f.

The CPU 30a controls each section of the apparatus and performs various operations in compliance with programs stored in the HDD 30d etc.

The ROM 30b stores basic programs executed by the CPU 30a, data, and the like.

The RAM 30c temporarily stores programs being executed by the CPU 30a and data being operated by the CPU 30a.

The HDD 30d stores programs executed by the CPU 30a, indexes, etc.

The GC 30e performs a drawing process in accordance with a drawing command supplied from the CPU 30a, converts an image obtained to image signals, and outputs them.

The I/F 30f properly converts the format of data input from an input device 32, and performs format or protocol conversion so that information can be sent and received via the networks 40 and 42.

A display device 31 consists of, for example, a cathode ray tube (CRT) monitor etc. and displays image signals output from the GC 30e of the information processing apparatus 30.

The input device 32 consists of, for example, a keyboard or mouse, generates information in response to a user's operation, and outputs it.

Figure 4:
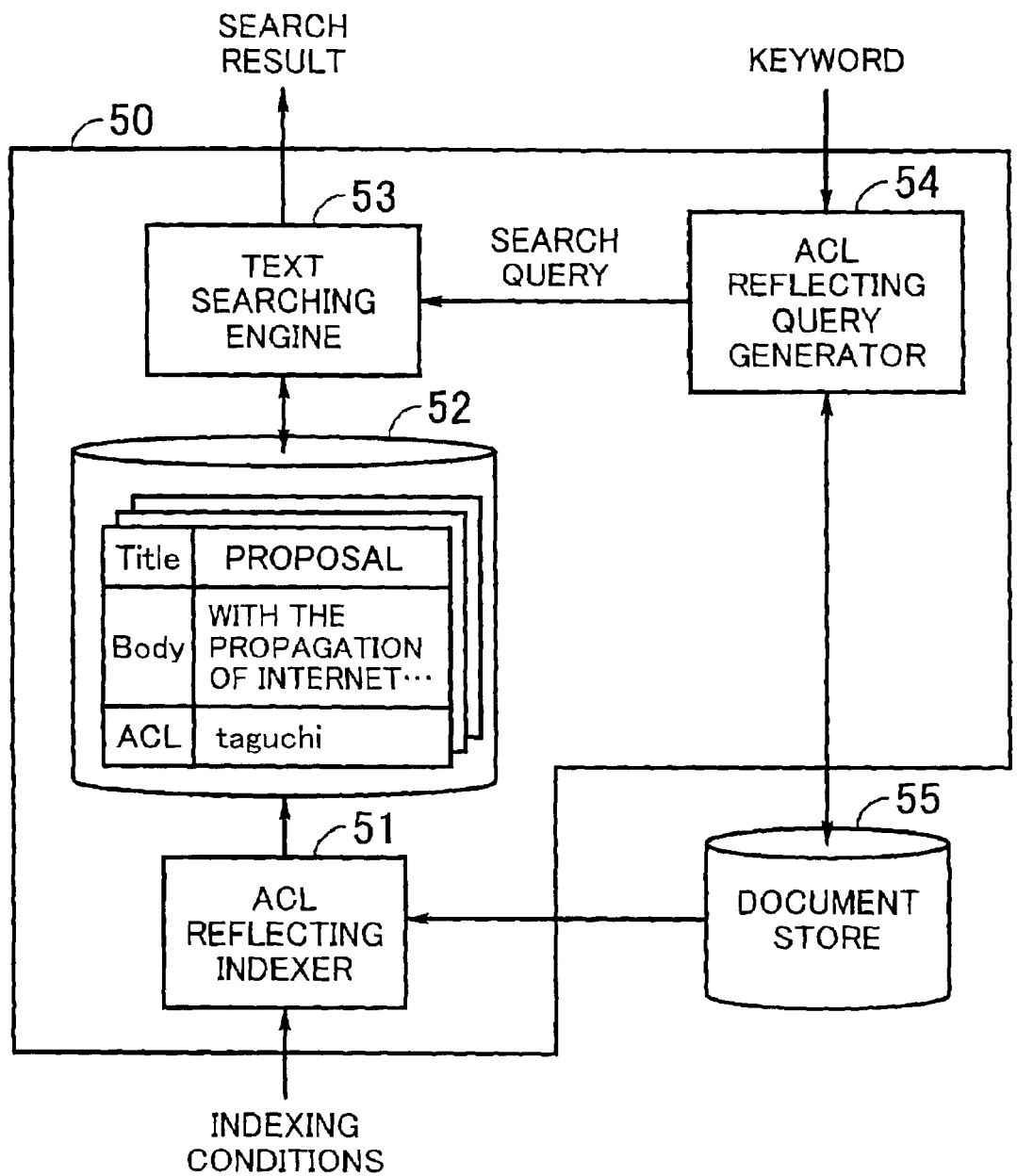
FIG. 4 is a view for giving an overview of functions achieved by an information processing apparatus when a predetermined program stored in the HDD shown in FIG. 3 is executed.

In this embodiment, a program stored in the HDD 30d shown in FIG. 3 is read out to the RAM 30c at need and various processes are performed. FIG. 4 is a view for giving an overview of functions achieved by the information processing apparatus 30 when a predetermined program stored in the HDD 30d is executed.

In FIG. 4, an access control (ACL) reflecting indexer 51 generates an index conforming to indexing conditions input and stores it in an index storing section 52.

The index storing section 52 stores an index supplied from the ACL reflecting indexer 51. In this case, if a plurality of document stores exist, indexes are stored separately, for example, according to document stores.

A text searching engine 53 searches the index storing section 52 for an index corresponding to a query (search query) supplied from an ACL reflecting query generator 54 and outputs it as a search result.

The ACL reflecting query generator 54 generates a search query from a keyword input by a user and information indicating access rights and supplies it to the text searching engine 53.

An overview of operation in the above embodiment will now be given.

Figure 5:
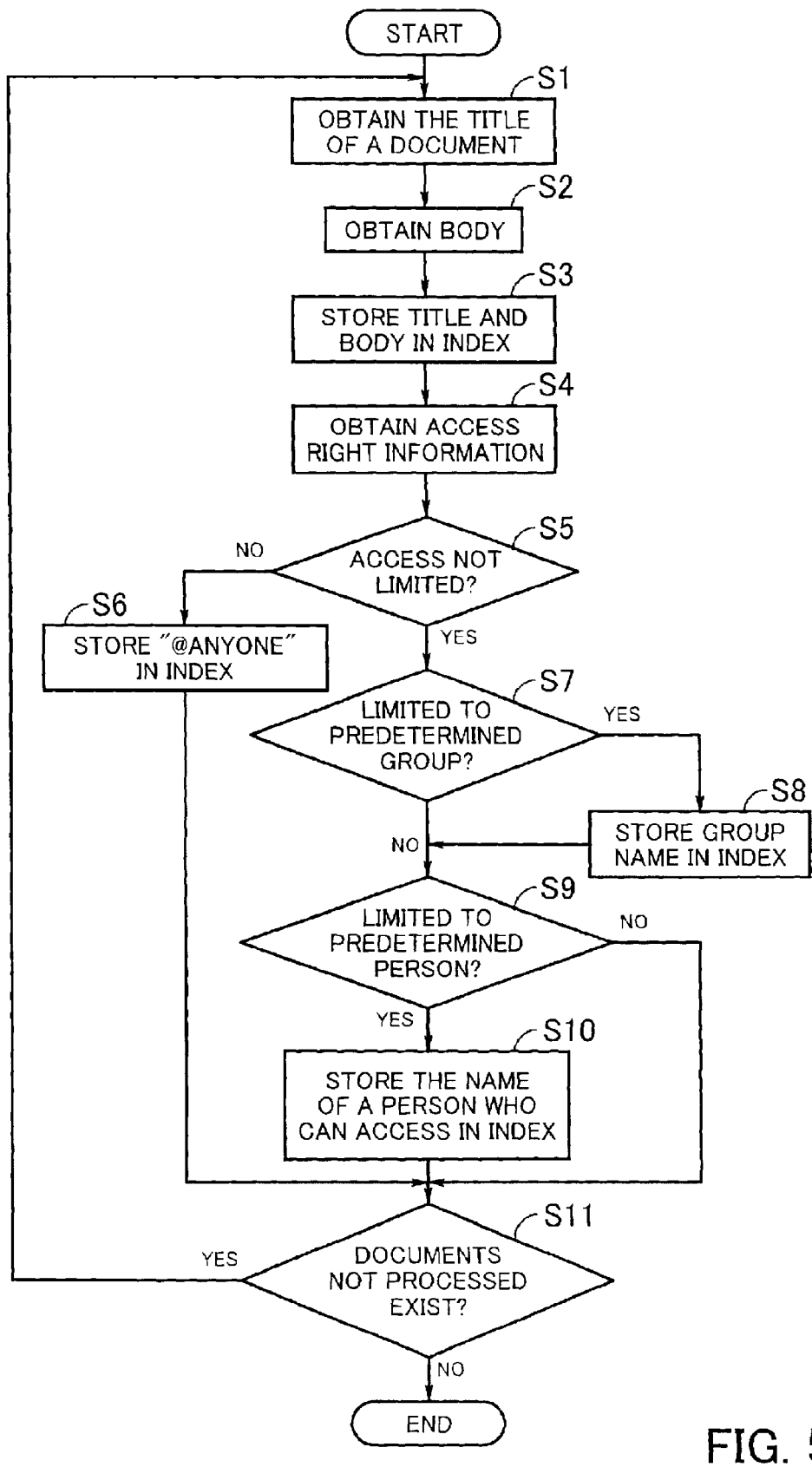
FIG. 5 is a flow chart for describing an example of a procedure performed when an index is generated in the embodiment shown in FIG. 3.

First, operation performed when an index is generated will be described with reference to FIG. 5. This flow chart is started and executed in a predetermined cycle. The following procedure will be performed in compliance with this flow chart.

[S1] The ACL reflecting indexer 51 obtains the title of a predetermined document stored in a document store 55.

For example, the ACL reflecting indexer 51 obtains the title "Proposal" from a document.

[S2] The ACL reflecting indexer 51 obtains the body of the document.

For example, the ACL reflecting indexer 51 obtains the body "With the propagation of Internet, the market is globalized increasingly . . . " from the document.

[S3] The ACL reflecting indexer 51 stores the title and body, which were obtained in steps S1 and S2, in Title and Body of an index respectively.

[S4] The ACL reflecting indexer 51 obtains access right information regarding the document from the document store 55.

[S5] The ACL reflecting indexer 51 judges whether or not access to the document is limited (anybody can refer to the document). If access to the document is not limited, the ACL reflecting indexer 51 proceeds to step S6; if access to the document is limited, the ACL reflecting indexer 51 proceeds to step S7.

[S6] The ACL reflecting indexer 51 stores the symbol "@anyone," which indicates that access to the document is not limited (that anybody can refer to the document), in ACL of the index where right information is stored.

[S7] The ACL reflecting indexer 51 judges whether or not access to the document is limited so that a predetermined group can refer to it. If access to the document is limited so that a predetermined group can refer to it, the ACL reflecting indexer 51 proceeds to step S8; if not so, the ACL reflecting indexer 51 proceeds to step S9.

[S8] The ACL reflecting indexer 51 stores the name of the group in ACL of the index and proceeds to step S9.

In this case, the symbol "#" should be added before a group name. Doing so will show that a group name appears after the symbol.

[S9] The ACL reflecting indexer 51 judges whether or not access to the document is limited so that a predetermined person can refer to it. If access to the document is limited so that a predetermined person can refer to it, the ACL reflecting indexer 51 proceeds to step S10; if not so, the ACL reflecting indexer 51 proceeds to step S11.

[S10] The ACL reflecting indexer 51 stores the name of a person who can access the document in ACL of the index.

[S11] The ACL reflecting indexer 51 judges whether or not a document not processed exists. If a document not processed exists, the ACL reflecting indexer 51 returns to step S1 to repeat the same process; if all the documents are processed, the ACL reflecting indexer 51 terminates the procedure.

FIG. 6 is an example of an index generated by the above procedure. In this example, "Proposal" is stored as "Title" of an index, "With the propagation of Internet, the market is globalized increasingly . . . " is stored as its "Body," and "taguchi" is stored as its "ACL". Such indexes will be generated according to documents and be stored in the index storing section 52.

Figure 7:
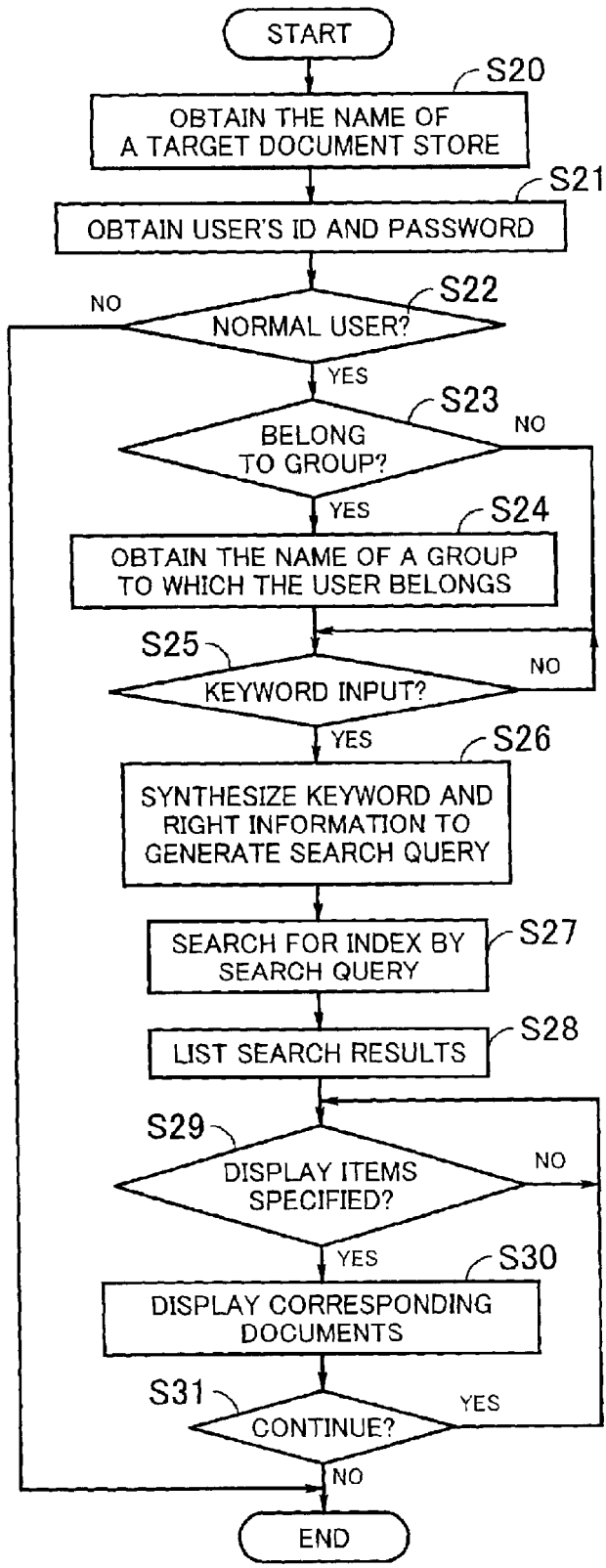
FIG. 7 is a flow chart for describing an example of a procedure performed when a document is searched for in the embodiment shown in FIG. 3.

With reference to FIG. 7, a procedure performed when a target document is searched for by the use of an index generated in the above way will now be described. The following procedure will be performed in compliance with this flow chart.

Figure 8:
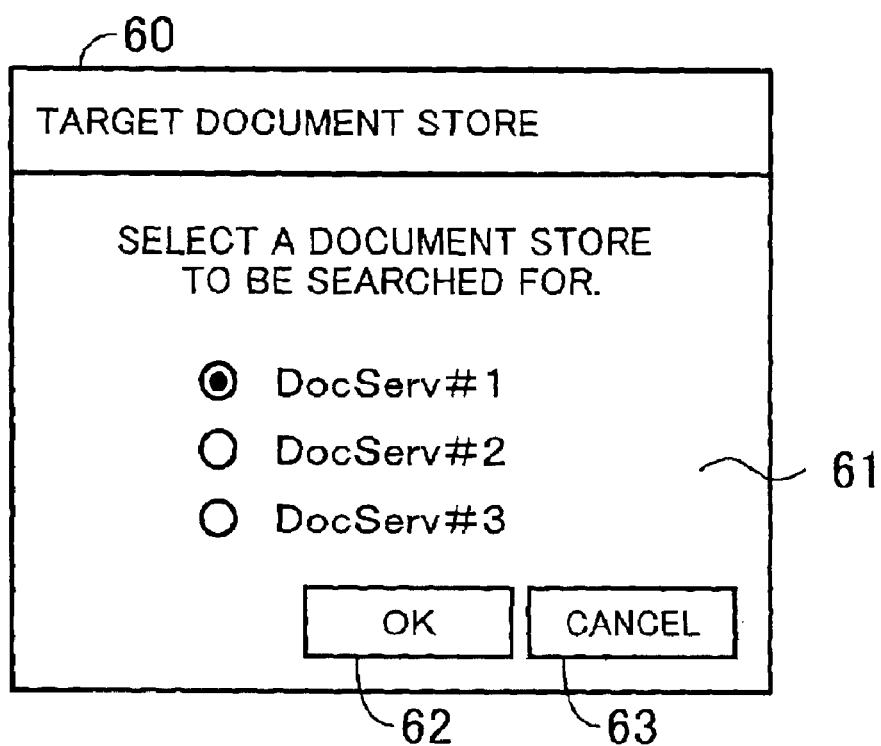
FIG. 8 is an example of a screen for specifying a target document store when the flow chart shown in FIG. 7 is performed.

[S20] The ACL reflecting query generator 54 causes a display device of a client who made a request to display a screen shown in, for example, FIG. 8 in order to obtain the name of a target document store.

In the example shown in FIG. 8, a window 60 titled "Target Document Store" is displayed and the names of target document stores and radio boxes are displayed in a display area 61. This enables to select a target document store. In this example only one document store is selected, but a plurality of document stores may be specified at the same time.

At the bottom of the display area 61, an OK button 62 for settling input provided and a cancel button 63 for canceling input provided are displayed.

Figure 9:
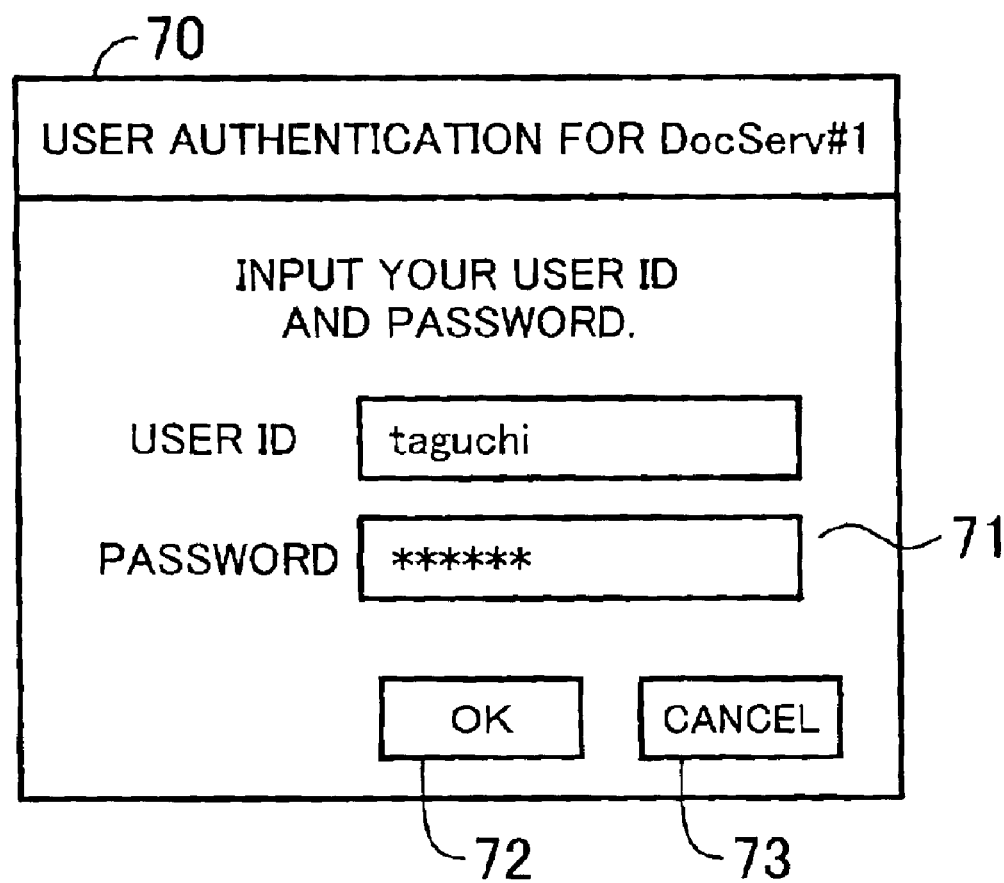
FIG. 9 is an example of a screen for performing user authentication when the flow chart shown in FIG. 7 is performed.

[S21] The ACL reflecting query generator 54 causes the display device of the client who made a request to display a screen shown in, for example, FIG. 9 in order to obtain a user ID and password necessary for logging in the selected document store.

In the example shown in FIG. 9, a window 70 titled "User Authentication for DocServ#1" is displayed and text boxes for inputting a user ID and password for DocServ#1 selected in step S21 are displayed in a display area 71. At the bottom of the display area 71, an OK button 72 for settling input provided and a cancel button 73 for canceling input provided are displayed.

[S22] The ACL reflecting query generator 54 inquires of the document store specified in step S20 the user ID and password input in step S21 in order to judge whether the client is a normal user. If the client proves to be a normal user, the ACL reflecting query generator 54 proceeds to step S23; if not so, the ACL reflecting query generator 54 terminates the procedure.

[S23] The ACL reflecting query generator 54 inquires of the document store specified in step S20 whether the user belongs to a group. If the user belongs to a group, the ACL reflecting query generator 54 proceeds to step S24; if the user does not belong to a group, the ACL reflecting query generator 54 proceeds to step S25.

[S24] The ACL reflecting query generator 54 obtains the name of a group to which the user belongs from a document store.

Figure 10:
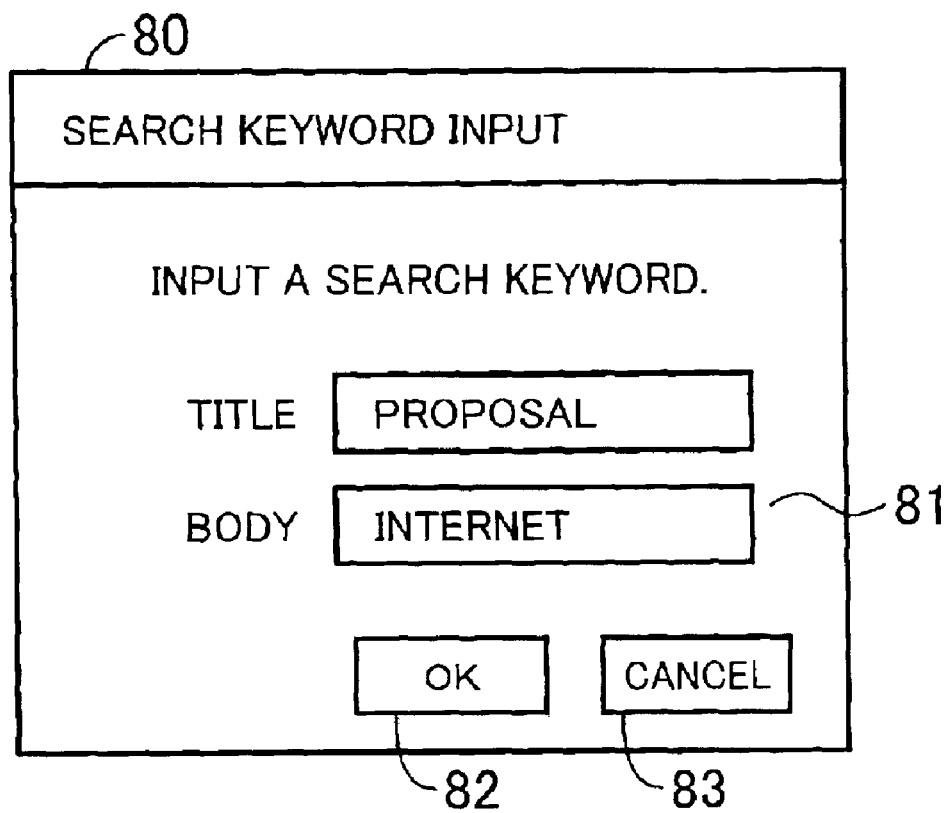
FIG. 10 is an example of a screen for inputting a keyword when the flow chart shown in FIG. 7 is performed.

[S25] The ACL reflecting query generator 54 causes the display device of the client who made a request to display a screen shown in, for example, FIG. 10 in order to accept keyword input. If a keyword is input on the screen shown in FIG. 10, the ACL reflecting query generator 54 proceeds to step S26; if not so, the ACL reflecting query generator 54 returns to step S25 to repeat the same process until a keyword is input.

In the example shown in FIG. 10, a window 80 titled "Search Keyword Input" is displayed and text boxes for inputting a keyword included in the title of a target document and a keyword included in its body respectively are displayed in a display area 81. At the bottom of the display area 81, an OK button 82 for settling input provided and a cancel button 83 for canceling input provided are displayed.

[S26] The ACL reflecting query generator 54 synthesizes the keyword input and right information to generate a search query.

Figure 11:
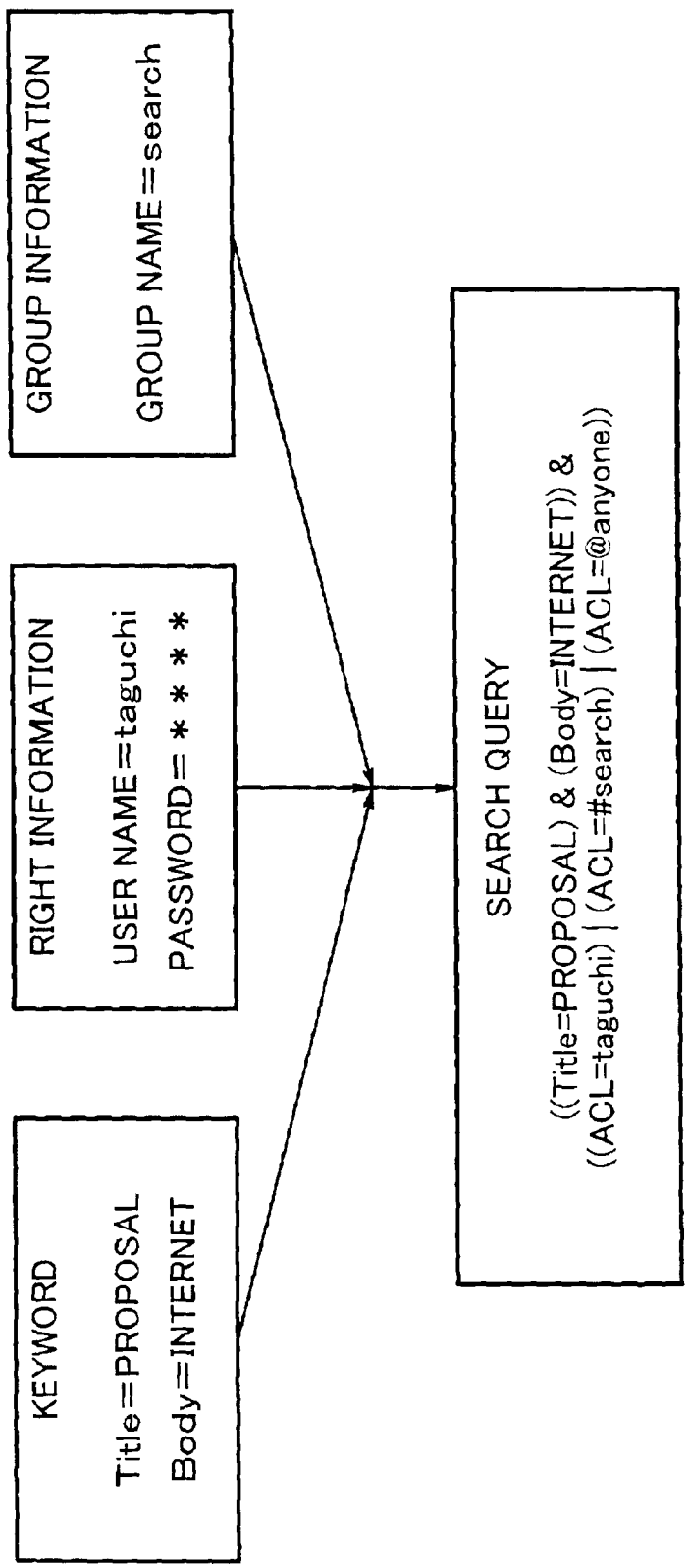
FIG. 11 is a view showing how a search query is generated from keywords and access rights.

FIG. 11 is a view for describing an example of the process of synthesizing a search query. In this example, keywords are "Title=Proposal" and "Body=Internet," right information is "User Name=taguchi" and "Password=****," and group information is "Group Name=search". These pieces of information are synthesized to obtain a search query shown at the bottom of FIG. 11. In this example (Title=Proposal) and (Body=Internet) are combined by the logical product symbol "&," so documents including both of them as keywords are searched for.

Furthermore, (ACL=taguchi), (ACL=#search), and (ACL=@anyone) are combined by the logical add symbols "|," so documents the right information of which is "taguchi," documents which belong to group "search," or documents access to which is not limited are searched for.

In addition, the keywords and access rights are combined by the logical product symbol "&," so documents which include the above keywords and meet one of the above access controls(ACL) are searched for as the whole expression.

[S27] The text searching engine 53 receives the search query generated by the ACL reflecting query generator 54 and searches the index storing section 52 for indexes in point.

[S28] The text searching engine 53 sends the titles of indexes obtained by searching to the client who made a request and causes his/her display device to list them.

Figure 12:
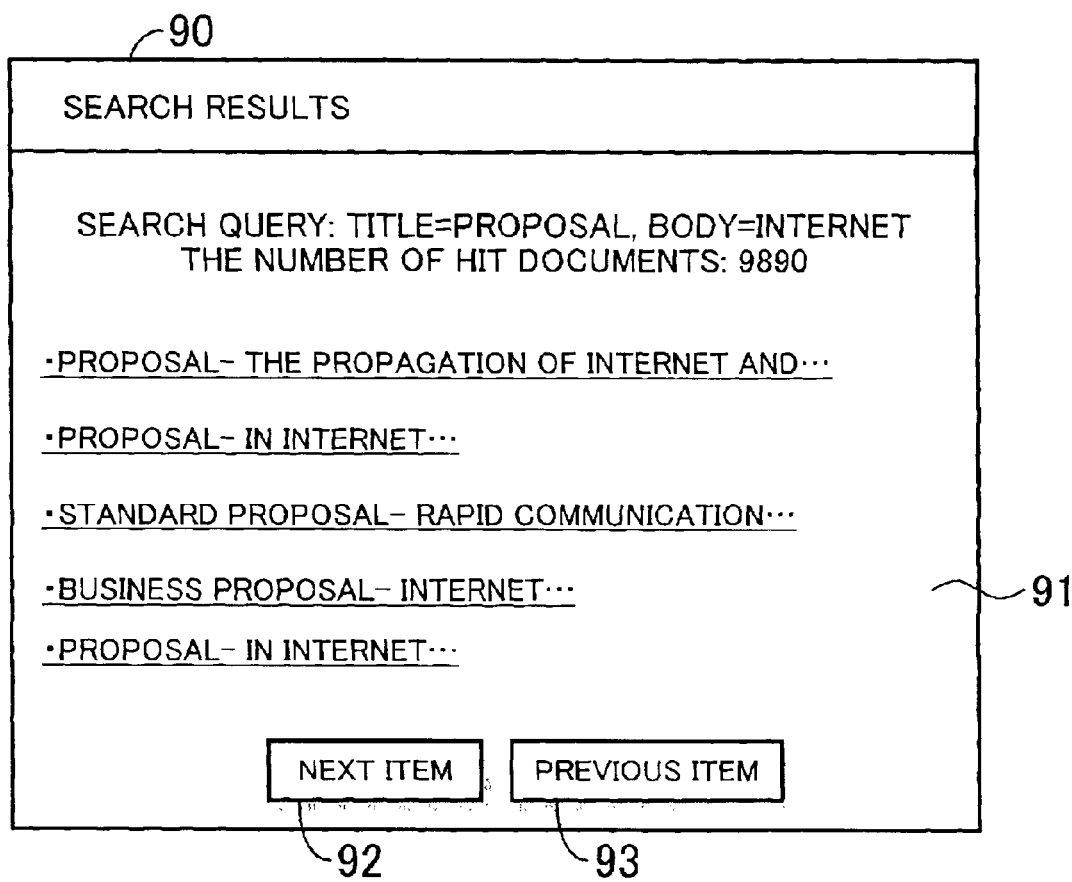
FIG. 12 is an example of a screen displaying search results obtained as a result of performing the flow chart shown in FIG. 7.

As a result, a screen shown in, for example, FIG. 12 will be displayed on the display device of the client who made a request. In this example, a window 90 titled "Search Results" is displayed and a message saying that there are 9890 documents which include "Proposal" in their titles and "Internet" in their bodies and that the first five documents are displayed is displayed in a display area 91. Under this message, the titles of documents obtained by searching are listed. Under these titles, Next Item button 92 for displaying the next item and Previous Item button 93 for displaying the previous one are displayed.

[S29] If predetermined display items are specified on the client's display device, the procedure proceeds to step S30; if not so, the procedure returns to step S29 to repeat the same process.

[S30] The information processing apparatus 50 obtains documents in point from the document store 55 and causes the display device of the client who made a request to display them.

[S31] The information processing apparatus 50 judges whether it continues the procedure. If the procedure continues, it returns to step S29 to repeat the same process; if the procedure does not continue, it terminates.

If Next Item button 92 or Previous Item button 93 shown in FIG. 12 is clicked, the information processing apparatus 50 will obtain documents in point from the document store 55 according to the number of times it is clicked and sends them to the client who made a request. This is not shown in this flow chart.

As described above, in the embodiment of the present invention, an index to which right information is added is managed. This enables to selectively search for only documents for which a user who made a request has access rights by the use of a search query including right information. Accordingly, after search results are obtained, there is no need to inquire of the document store 55 whether the user has access rights. This enables a quick searching process.

Figure 13:
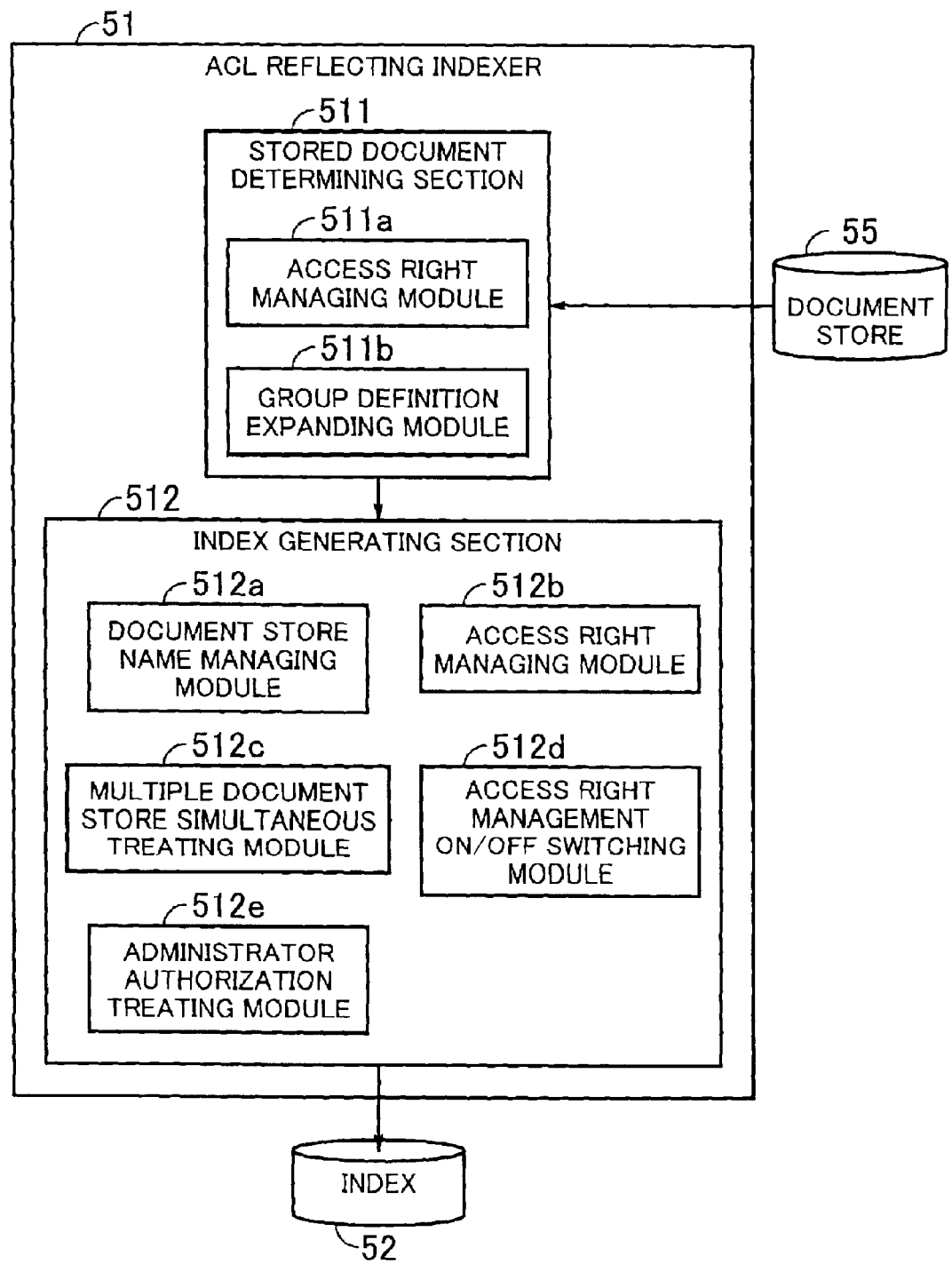
FIG. 13 is a view showing the detailed configuration of the ACL reflecting indexer shown in FIG. 4.
Figure 14:
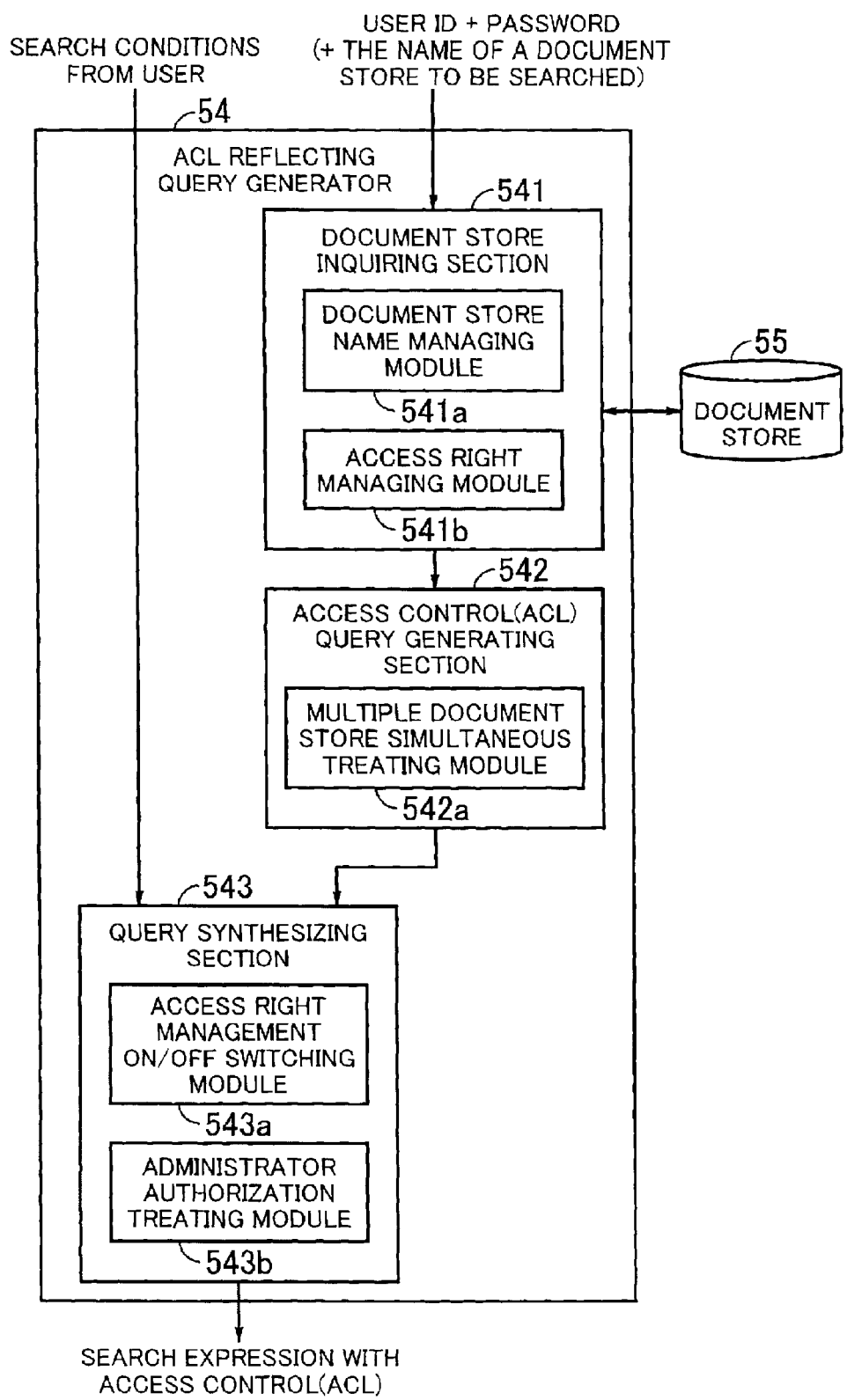
FIG. 14 is a view showing the detailed configuration of the ACL reflecting query generator shown in FIG. 4.

With reference to FIGS. 13 and 14, the detailed configuration of the embodiment of the present invention shown in FIG. 4 and the operation of each of its sections will now be described.

FIG. 13 is a view showing the detailed configuration of the ACL reflecting indexer 51. As shown in FIG. 13, the ACL reflecting indexer 51 includes a stored document determining section 511 and an index generating section 512.

The stored document determining section 511 includes an access right managing module 511a and a group definition expanding module 511b and determines for which document in the document store 55 an index should be generated or updated.

The index generating section 512 includes a document store name managing module 512a, access right managing module 512b, a multiple document store simultaneous treating module 512c, an access right management on/off switching module 512d, and an administrator authorization treating module 512e and generates an index actually from a document determined by the stored document determining section 511.

If an access method differs from document store to document store, the access right managing module 511a manages their procedures.

The group definition expanding module 511b performs a process regarding a group definition at the time of generating an index.

The document store name managing module 512a specifies a target document store if there exist a plurality of document stores.

The access right managing module 512b manages procedures necessary for obtaining right information from document stores access rights for which are managed by different methods.

The multiple document store simultaneous treating module 512c generates an index by which a plurality of document stores can be searched simultaneously.

If the management of access rights is not necessary, the access right management on/off switching module 512d operates so that control by access rights is not performed.

The administrator authorization treating module 512e enables an administrator to search for all documents.

FIG. 14 is a view showing the detailed configuration of the ACL reflecting query generator 54. As shown in FIG. 14, the ACL reflecting query generator 54 includes a document store inquiring section 541, an access control(ACL) query generating section 542, and a query synthesizing section 543.

The document store inquiring section 541 includes a document store name managing module 541a and an access right managing module 541b, performs user authentication on the basis of a user ID and password received from a user, and obtains information regarding a group to which the user belongs.

The access control(ACL) query generating section 542 includes a multiple document store simultaneous treating module 542a and generates a search query indicating access controls(ACL).

The query synthesizing section 543 includes an access right management on/off switching module 543a and an administrator authorization treating module 543b and synthesizes search conditions input by a user and a search query generated by the access control(ACL) query generating section 542.

The document store name managing module 541a specifies a target document store if there exist a plurality of document stores.

The access right managing module 541b manages procedures necessary for obtaining right information from document stores access rights for which are managed by different methods.

The multiple document store simultaneous treating module 542a performs a process for enabling to search a plurality of document stores simultaneously.

If the management of access rights is not necessary, the access right management on/off switching module 543a operates so that control by access rights is not performed.

The administrator authorization treating module 543b enables an administrator to search for all documents.

Now, the detailed operation of each section in the above embodiment will be described.

Figure 15:
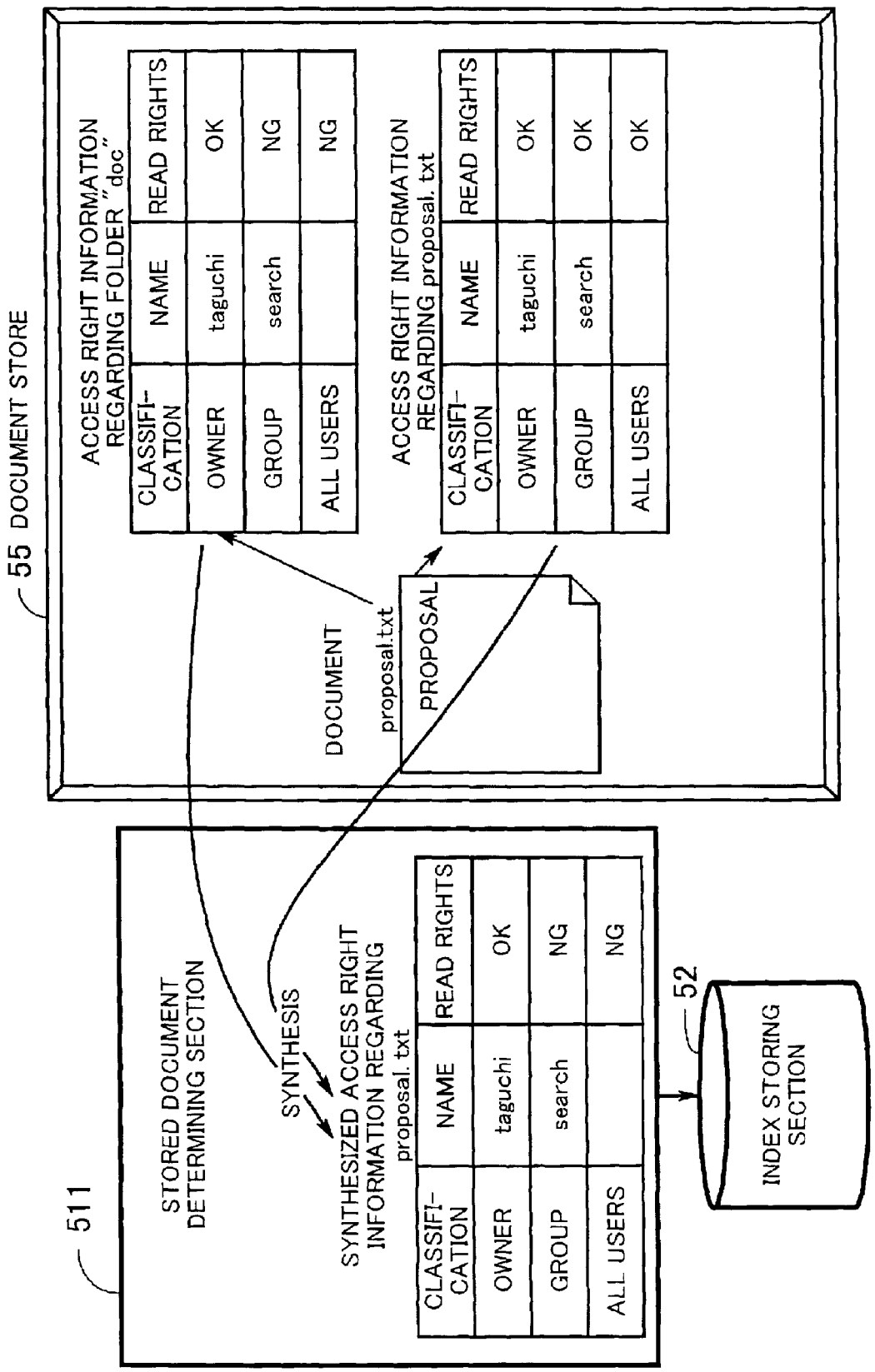
FIG. 15 is a view showing an example of the operation of a stored document determining section.

FIG. 15 is a view for describing the operation of the stored document determining section 511. The stored document determining section 511 basically performs a process for determining a document for which an index is generated, but it performs a process for synthesizing access rights if access rights differ from hierarchy to hierarchy. That is to say, if the document store 55 has hierarchy structure and access rights can be set for each hierarchy, access rights for a target document need to be determined from its relations with an upper hierarchy.

In the example shown in FIG. 15, target document "proposal. txt" is stored in folder "doc" and access rights differ between them. That is to say, access rights for folder "doc" are "OK" only for owner "taguchi". On the other hand, access rights for document "proposal. txt" are "OK" for all users.

In this case it is thought that the stricter access rights should be adopted for the document. Therefore, if access rights for one of the two are "NG," then "NG" is adopted for that item.

Results obtained by synthesizing access rights for the folder and document in this way are shown on the left-hand side of FIG. 15. In this example all the items except owner "taguchi" are "NG".

In this example the two hierarchies of a document and folder exist, but the above way is also applicable to cases where a plurality of hierarchies of other types exist.

As stated above, if a target document is stored in a document store having hierarchy structure and access rights can be set for each hierarchy, the stored document determining section 511 synthesizes access rights for the target document and access rights for a hierarchy higher than the document to obtain access rights for the document. This way is an example. It is a matter of course that the present invention is not limited to such a case.

Figure 16:
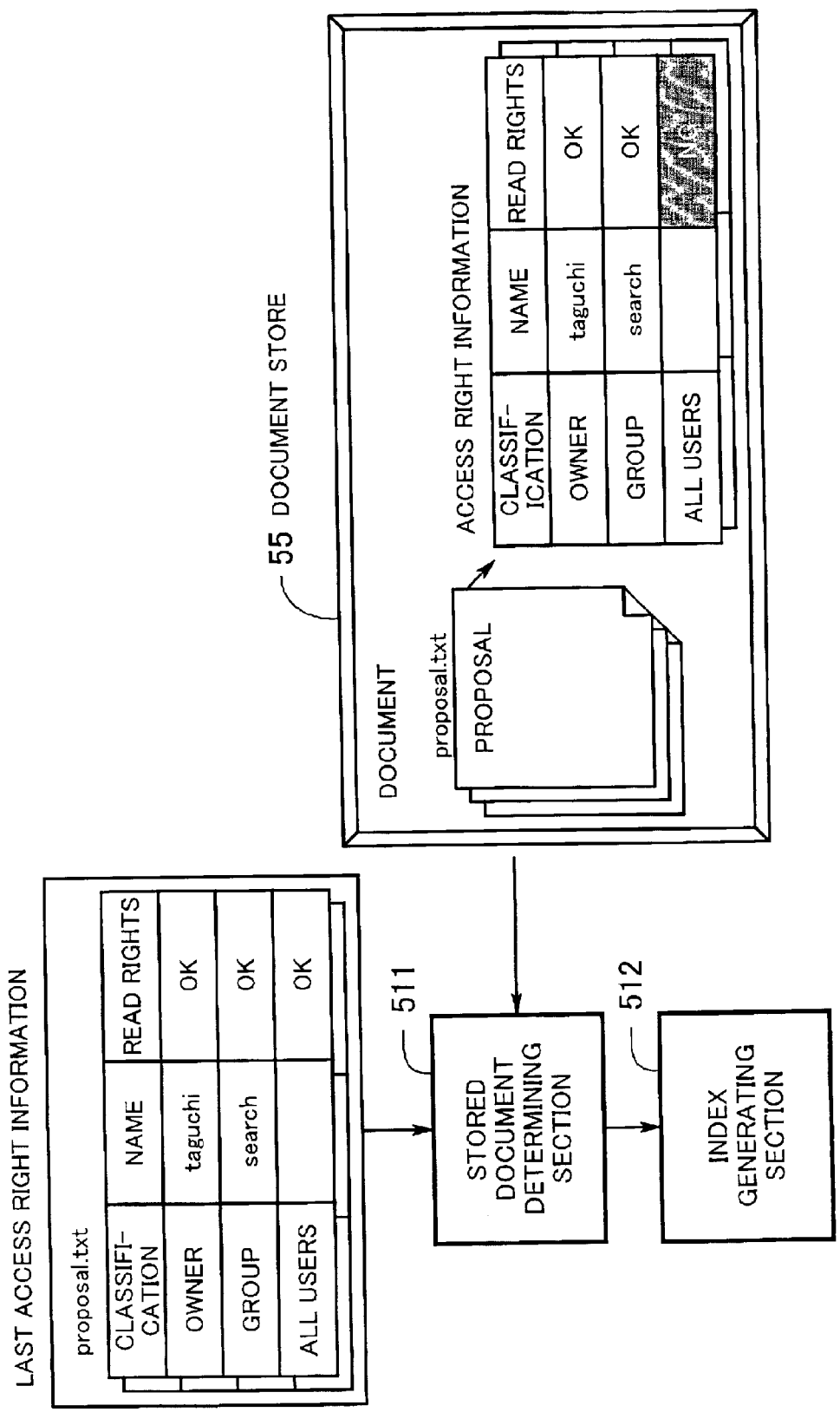
FIG. 16 is a view showing an example of the operation of a stored document determining section.

With reference to FIG. 16, a process performed when access rights are changed will now be described.

When access rights for a document stored in the document store 55 are changed, ACL in its index needs to be changed accordingly.

In this embodiment, therefore, the stored document determining section 511 searches the document store 55 every predetermined time to check whether or not a difference has arisen between the current access rights and the contents of an index previously generated. If a difference has arisen, then an index will be updated in accordance with new right information.

This ensures that an index corresponds to the latest information.

Figure 17:
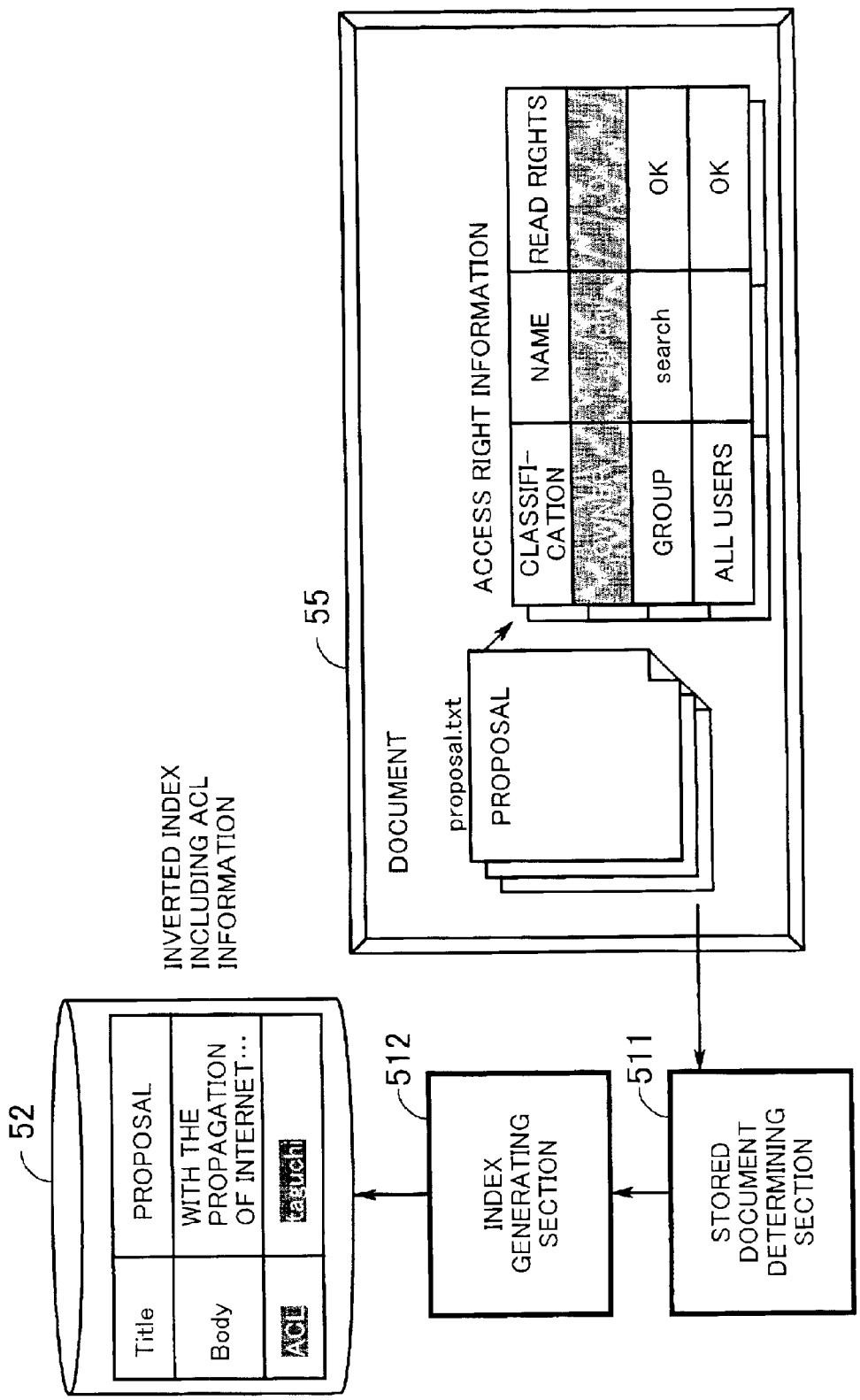
FIG. 17 is a view showing an example of the operation of an index generating section.
Figure 18:
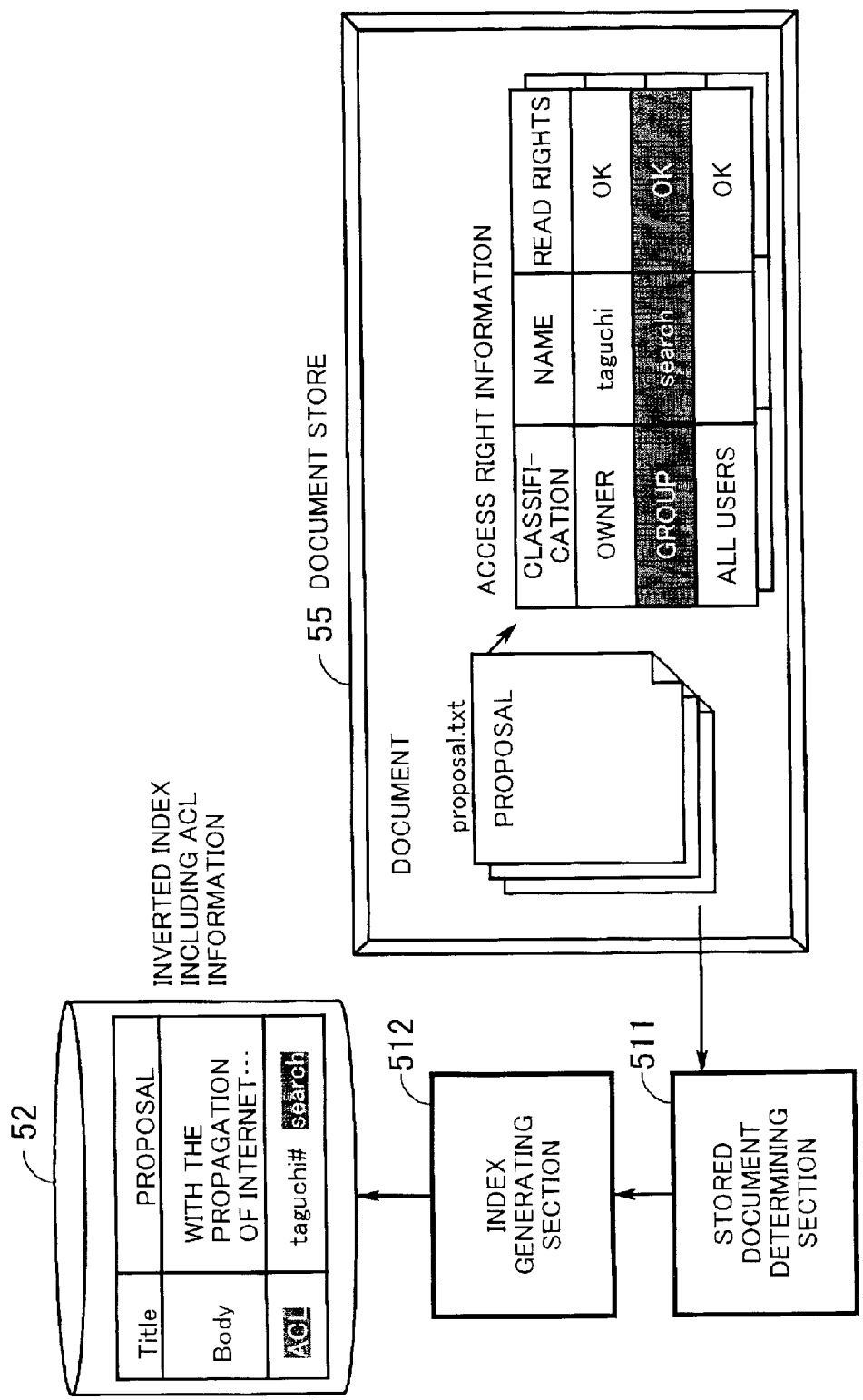
FIG. 18 is a view showing an example of the operation of an index generating section.
Figure 19:
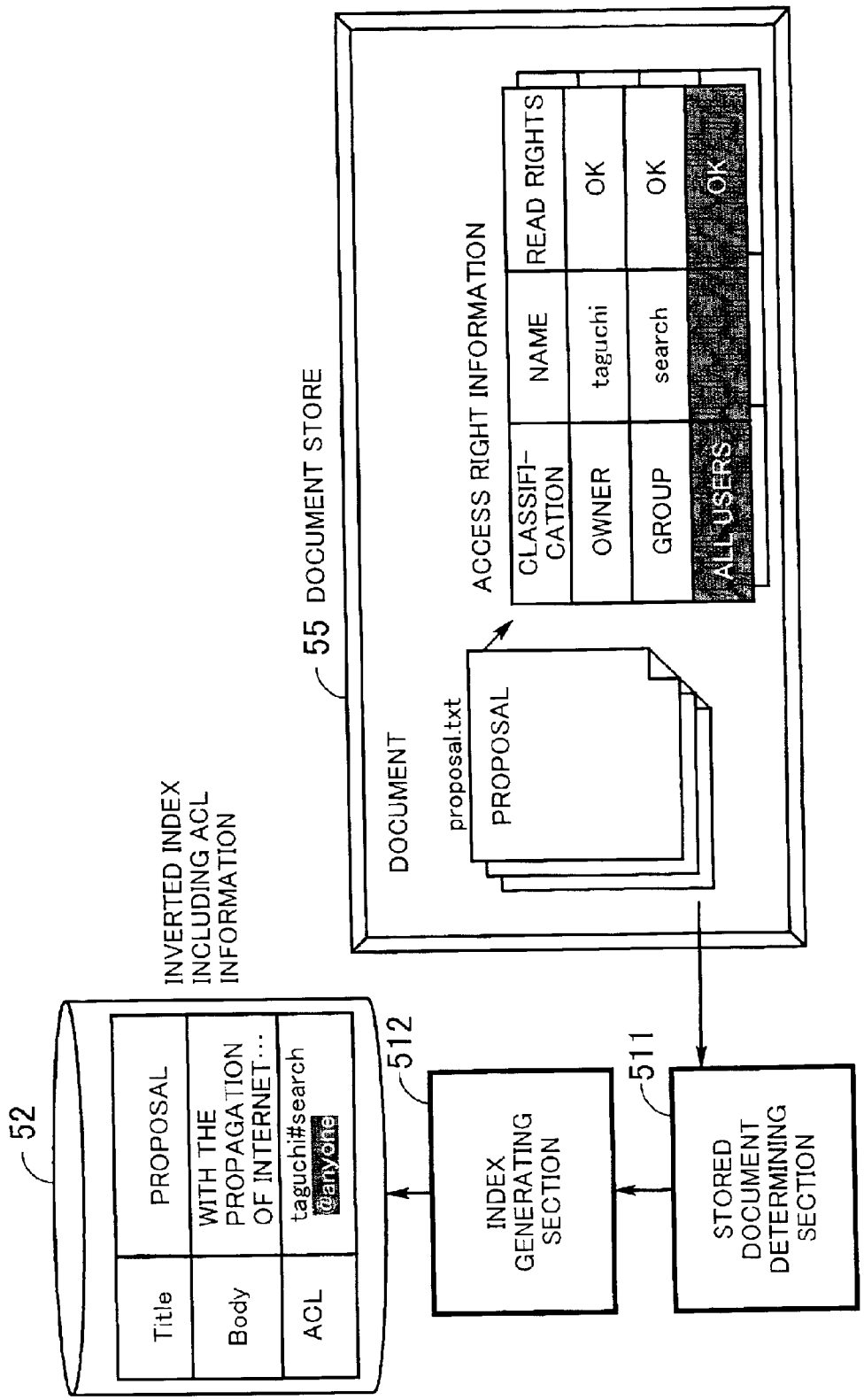
FIG. 19 is a view showing an example of the operation of an index generating section.

With reference to FIGS. 17 through 19, the operation of the index generating section 512 for setting right information in ACL of an index will now be described.

FIG. 17 is a view showing how ACL is set to the owner of a document. In an example shown in FIG. 17, the owner of document "proposal.txt" is "taguchi" and, as shown in access right information, the read rights of the owner are "OK".

If the access rights of the owner of a document are "OK" as with this example, the stored document determining section 511 informs the index generating section 512 of this. Then the index generating section 512 stores "taguchi," being the owner's ID, in ACL of the index. As a result, the index will indicate that owner "taguchi" has access rights for this document.

FIG. 18 is a view showing how ACL is set in the case of a document being owned by a group. In an example shown in FIG. 18, the group owner of document "proposal.txt" is "search" and, as shown in access right information, the read rights of the group owner are "OK".

If the access rights of a group owner are "OK" as with this example, the stored document determining section 511 informs the index generating section 512 of this. Then the index generating section 512 stores "#search," being the group owner's ID, in ACL of the index. As a result, the index will indicate that a user belonging to group "search" has access rights for this document.

FIG. 19 is a view showing how right information for permitting all users to access a document is set in ACL.

In an example shown in FIG. 19, the access rights of all users in access right information are "OK". If the access rights of all users are "OK" as with this example, the stored document determining section 511 informs the index generating section 512 of this. Then the index generating section 512 stores "@anyone," indicating all users, in ACL of the index. As a result, the index will indicate that all users have access rights for this document.

In the above examples access rights were created for "owner," "group," and "all users" in that order, but it is possible to process "all users" preferentially. If access rights are given to all users, processes about the access rights of users of other types may be omitted. When access rights are given to all users, there is no need to give access rights individually to an owner or group.

Figure 20:
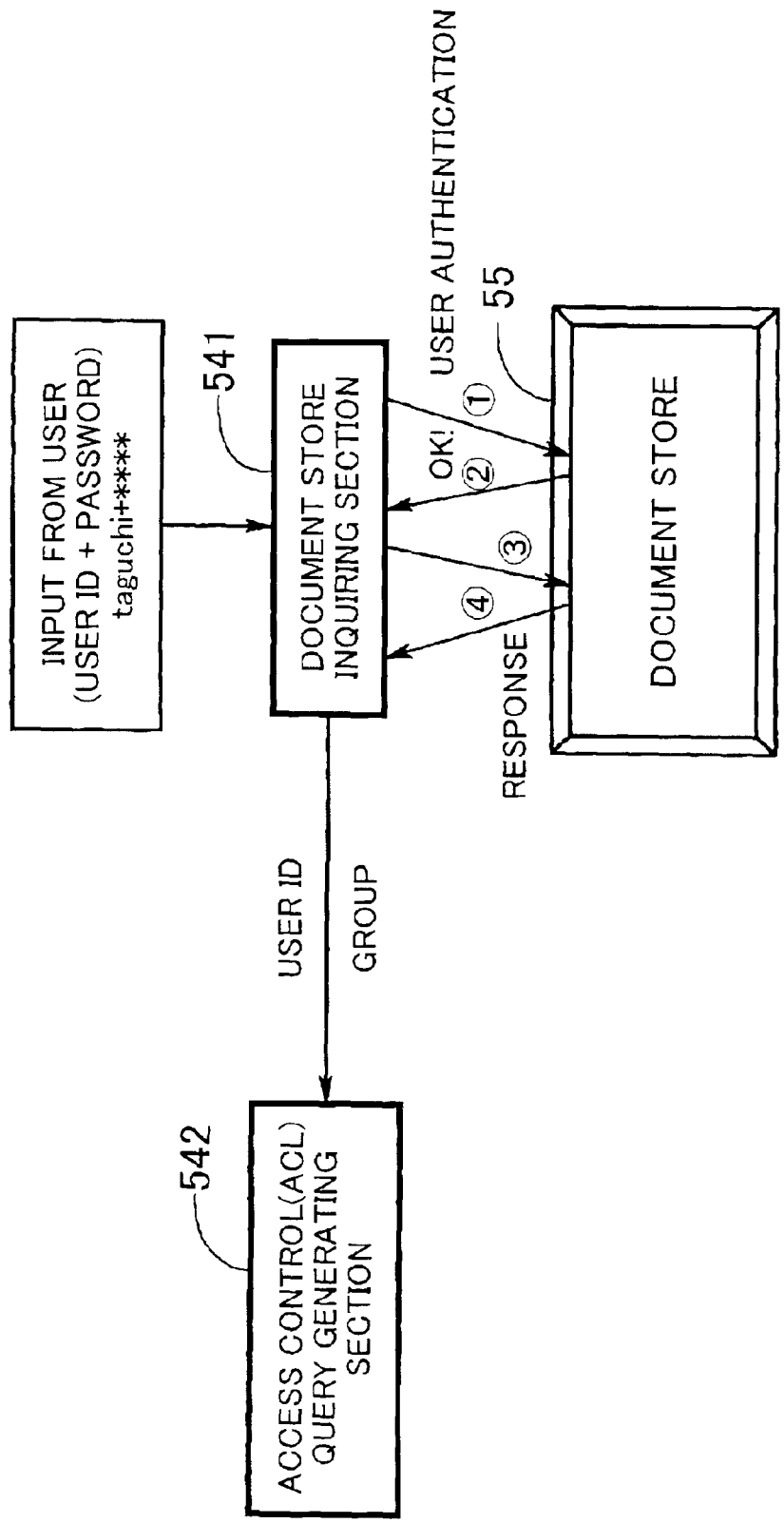
FIG. 20 is a view showing an example of the operation of a document store inquiring section.

FIG. 20 is a view for describing the operation of the document store inquiring section 541.

As shown in FIG. 20, the document store inquiring section 541 obtains a user ID and password input by a user from a screen shown in, for example, FIG. 9 when he/she logged in a system, and inquires of a target document store (the document store 55 in this example) input on the screen shown in FIG. 8 whether or not this user is a normal user.

If this user proves to be a normal user, then the document store inquiring section 541 also inquires of the document store 55 the name of a group to which the user belongs.

Next, the document store inquiring section 541 provides the user ID and group name to the access control(ACL) query generating section 542.

Figure 21:
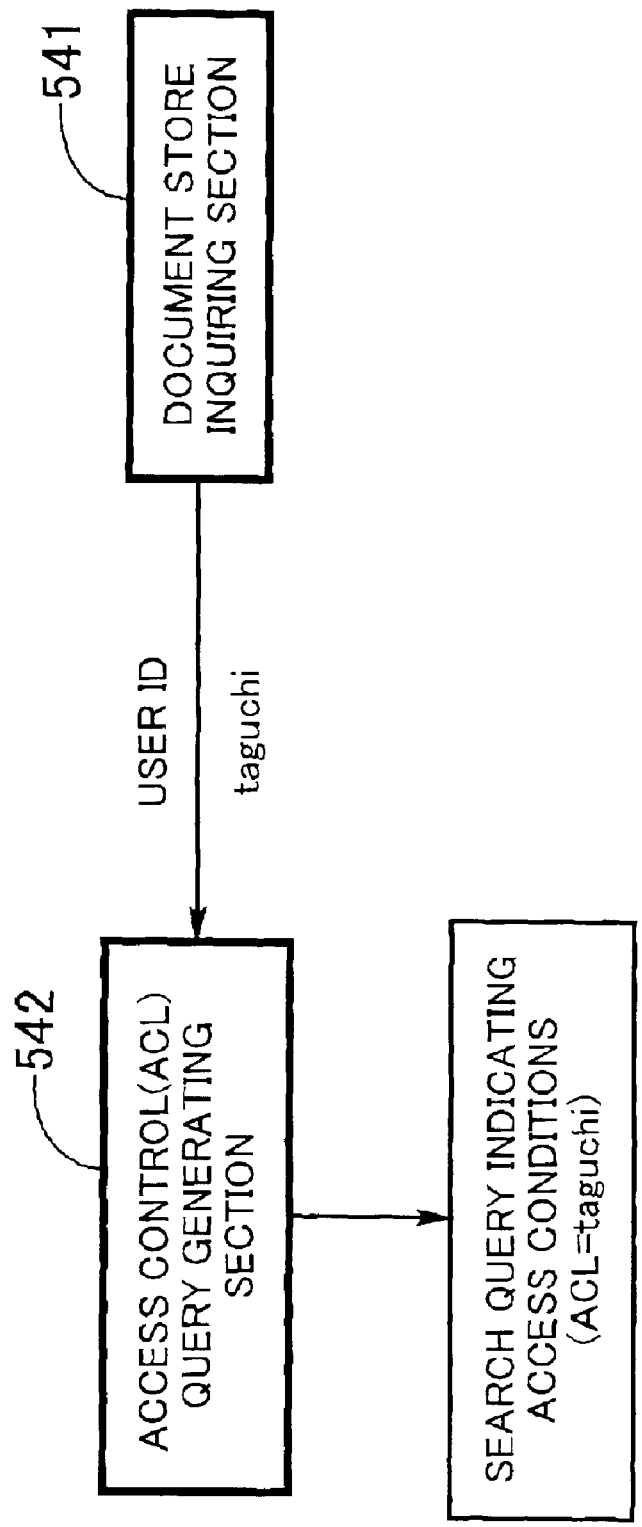
FIG. 21 is a view showing an example of the operation of an access control(ACL) query generating section.
Figure 22:
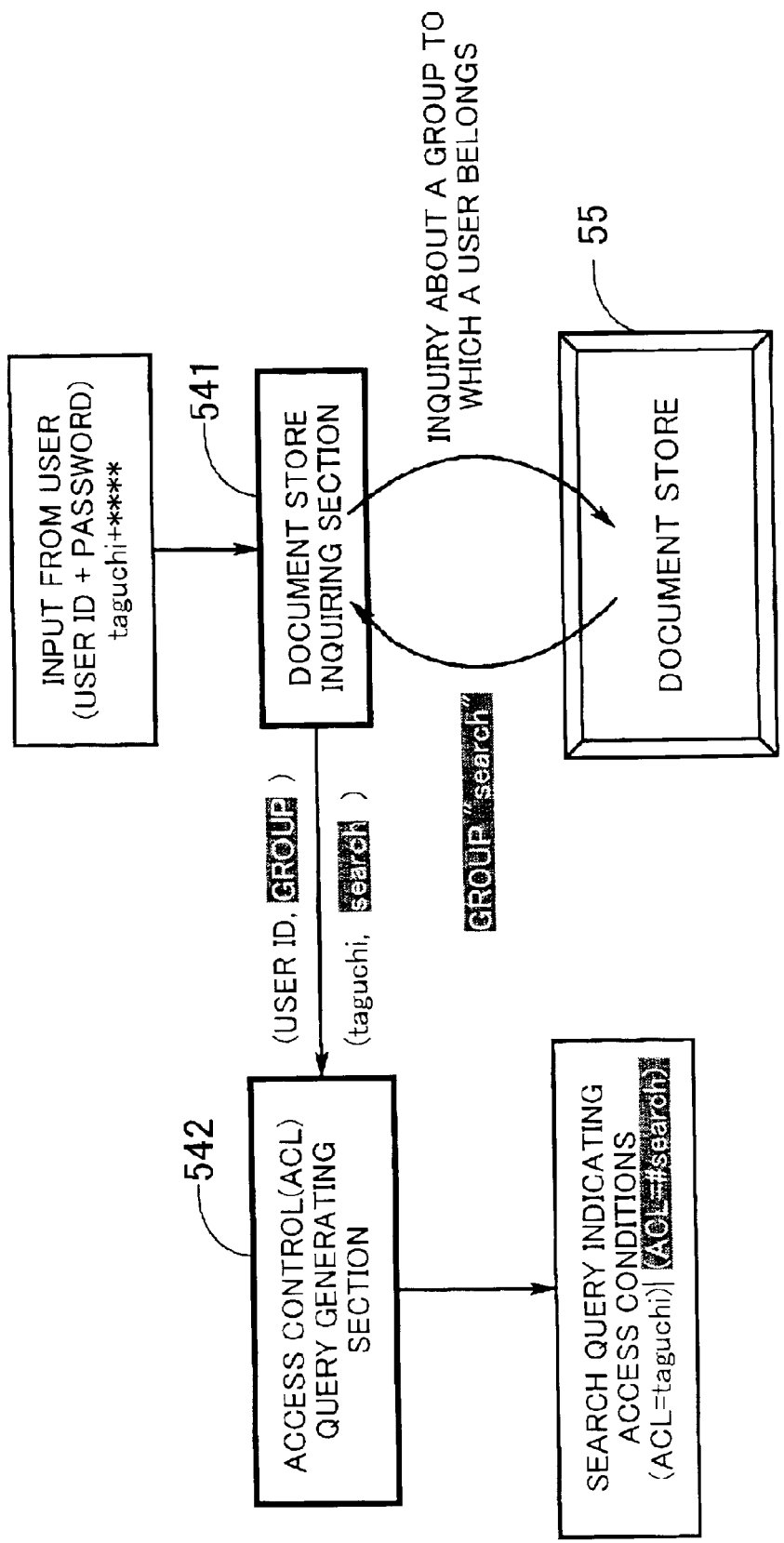
FIG. 22 is a view showing an example of the operation of an access control(ACL) query generating section.
Figure 23:
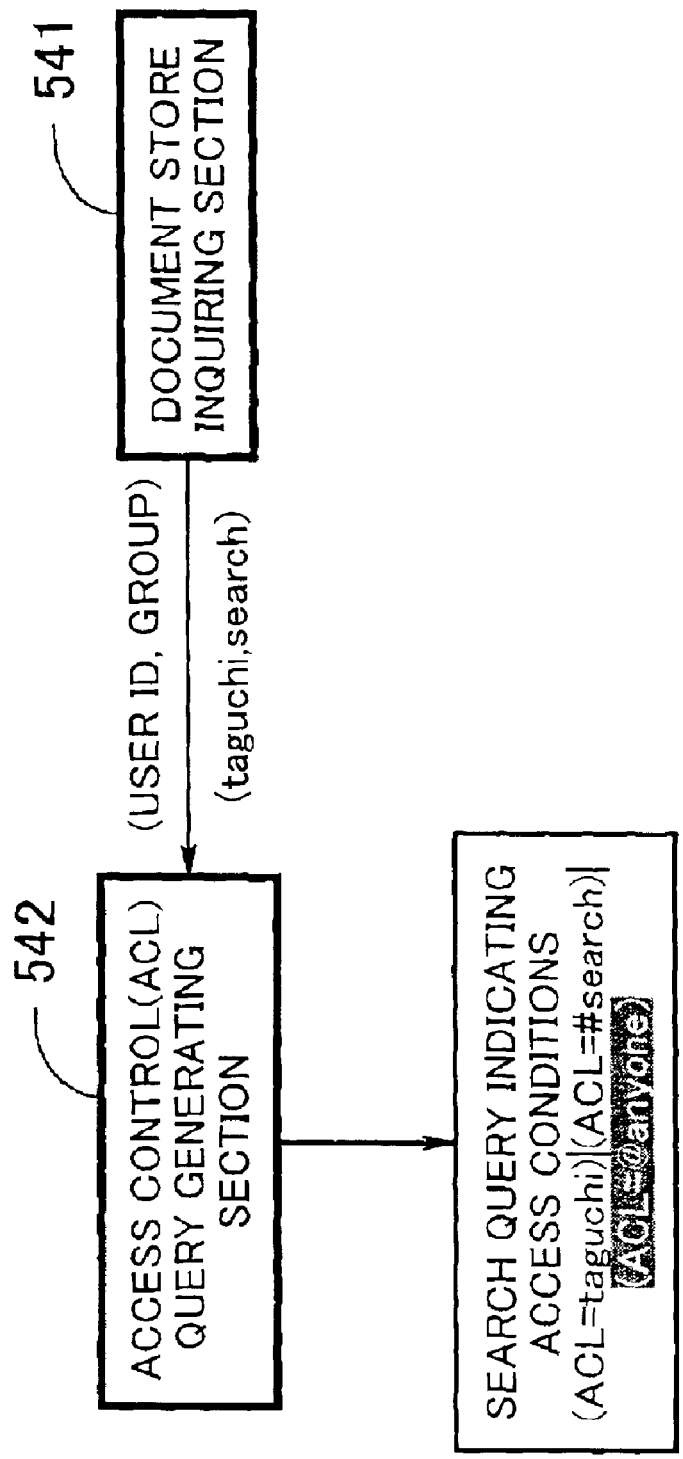
FIG. 23 is a view showing an example of the operation of an access control(ACL) query generating section.

With reference to FIGS. 21 through 23, the operation of the access control(ACL) query generating section 542 will now be described.

The access control(ACL) query generating section 542 generates a search query for selecting only documents for which a user who searches for has access rights.

First, as shown in FIG. 21, the access control(ACL) query generating section 542 generates a search query for selecting only documents for which the user has access rights on the basis of a user ID supplied from the document store inquiring section 541. In this example a user ID is "taguchi," so the access control(ACL) query generating section 542 generates search query (ACL=taguchi).

Next, as shown in FIG. 22, the access control(ACL) query generating section 542 generates a search query for selecting only documents for which a group which the user belongs to has access rights on the basis of a group name supplied from the document store inquiring section 541. In this example the user belongs to group "search," so the access control (ACL) query generating section 542 generates search query (ACL=#search). The symbol "#" in this expression indicates that a group name appears after it.

The access control(ACL) query generating section 542 combines the previously generated query and the newly generated query by a logical add symbol to generate (ACL=taguchi)|(ACL=#search).

Finally, as shown in FIG. 23, the access control(ACL) query generating section 542 adds "@anyone," which indicates that access rights are given to all users, to the search query so that documents for which access rights are given to all users can be selected. That is to say, the access control (ACL) query generating section 542 adds "@anyone" to the conditional expression obtained through the above process to generate (ACL=taguchi) |(ACL=#search)|(ACL=@anyone). The symbol "@" in this expression indicates that a character string with a particular meaning appears after it.

Search query (ACL=taguchi) |(ACL=#search)|(ACL=@anyone) obtained in the above way indicates that a group of documents which user "taguchi" is permitted to access, a group of documents which group "search" is permitted to access, and a group of documents which all users are permitted to access are all searched.

Figure 24:
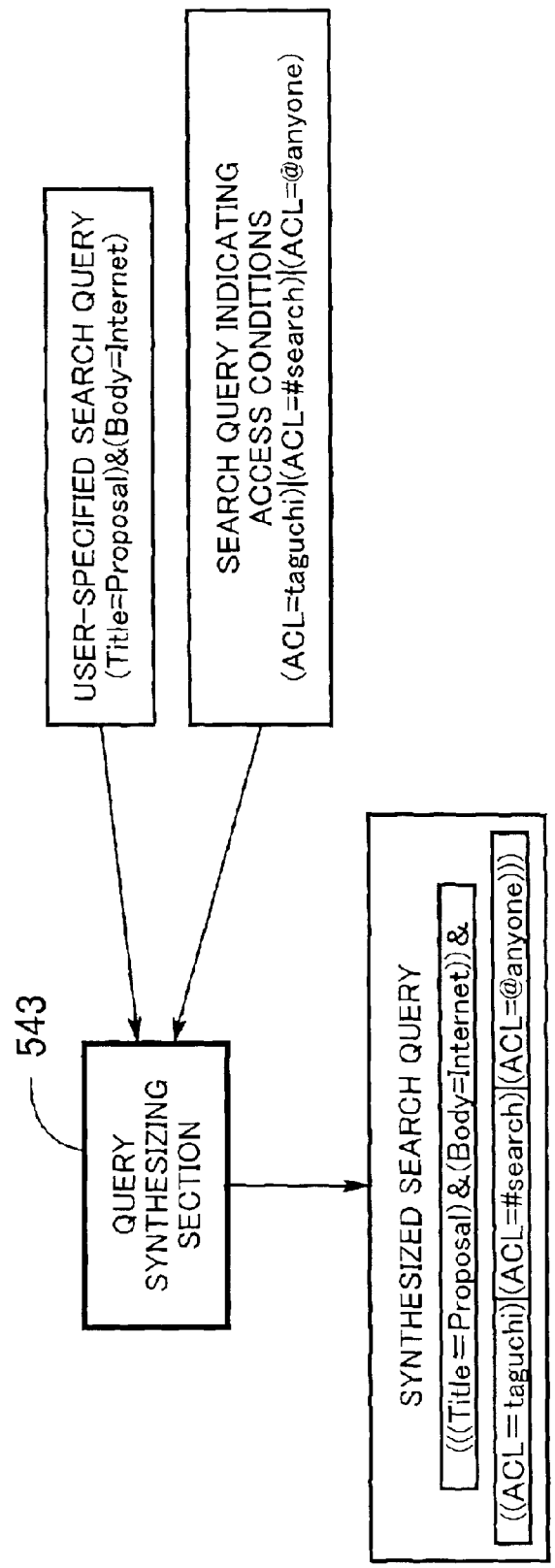
FIG. 24 is a view showing an example of the operation of a query synthesizing section.

With reference to FIG. 24, the operation of the query synthesizing section 543 will now be described.

The query synthesizing section 543 synthesizes a user-specified search query (conditions input from the screen shown in FIG. 10) and a search query indicating access controls(ACL) generated by the access control(ACL) query generating section 542 to generate a final search query.

In an example shown in FIG. 24, a user-specified search query is (Title=Proposal) & (Body=Internet) and a search query generated by the access control(ACL) query generating section 542 is (ACL=taguchi)|(ACL=#search)|(ACL=@anyone). In this case, the query synthesizing section 543 combines these conditional expressions by a logical product symbol to generate final search query (Title=Proposal)& (Body=Internet)&(ACL=taguchi)|(ACL=#search) |(ACL=@anyone). This conditional expression indicates that a group of documents which user "taguchi" is permitted to access, a group of documents which group "search" is permitted to access, and a group of documents which all users are permitted to access are searched for a document including "proposal" in its title and "Internet" in its body.

Figure 25:
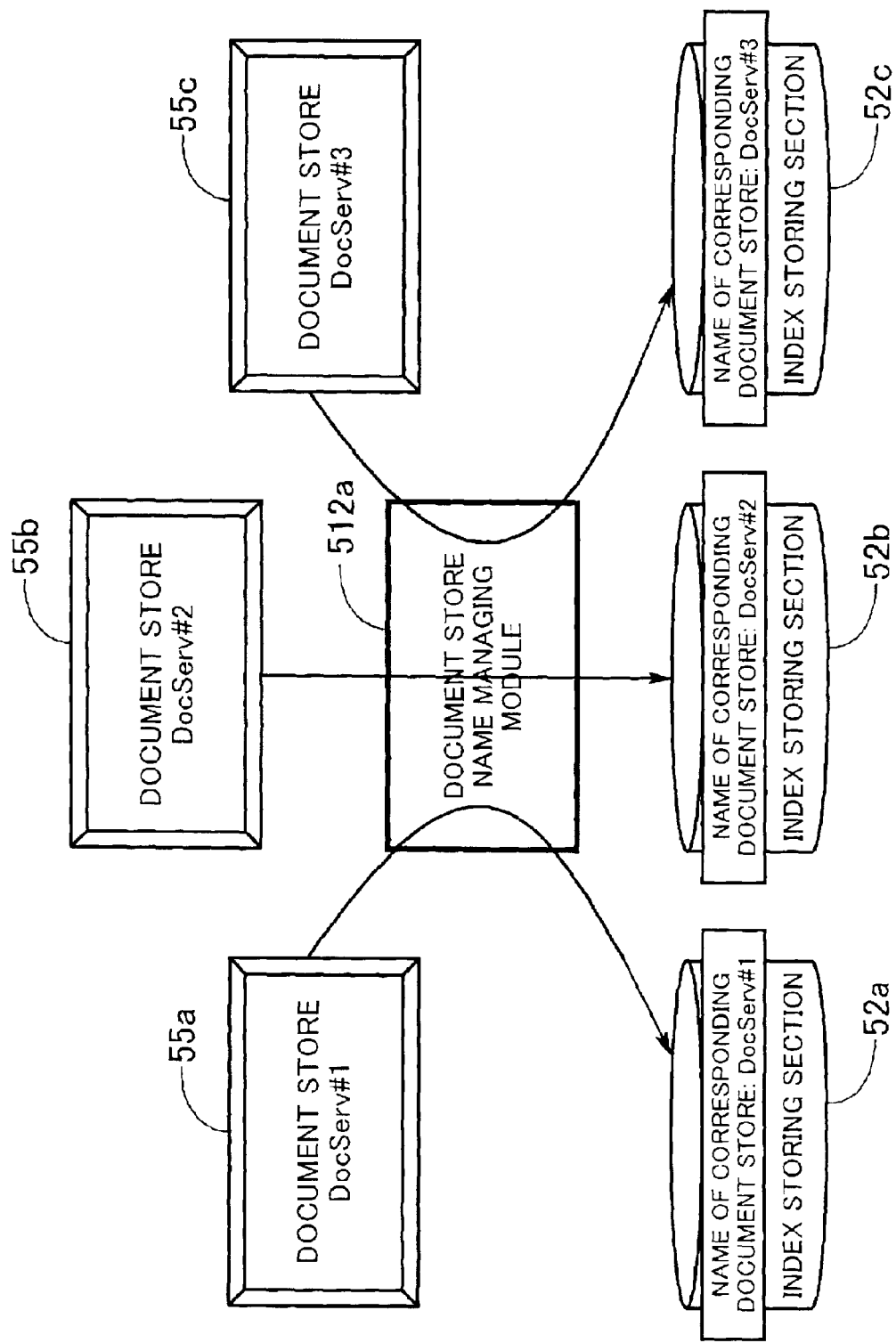
FIG. 25 is a view showing an example of the operation of a document store name managing module.
Figure 26:
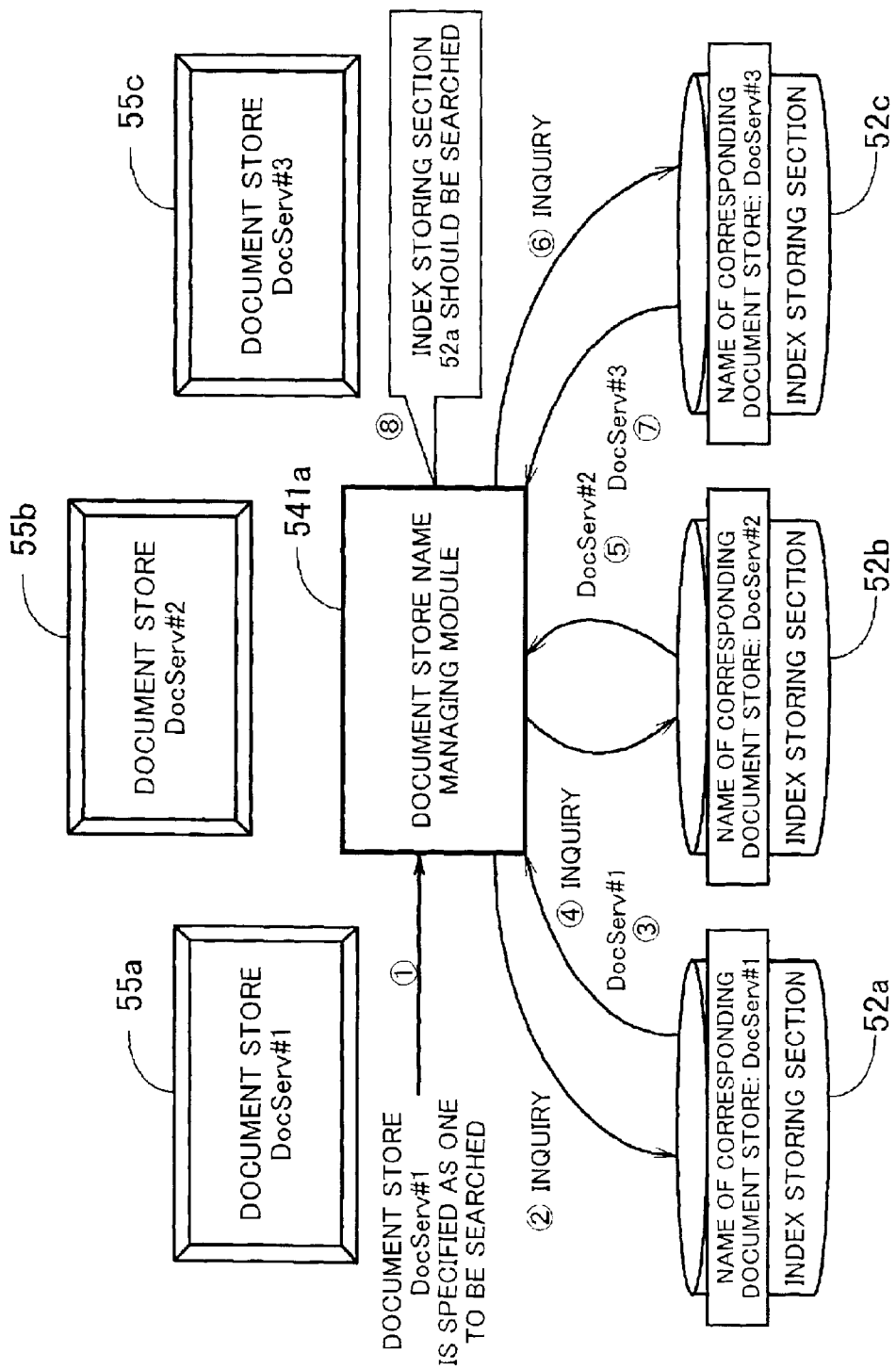
FIG. 26 is a view showing an example of the operation of a document store name managing module.

With reference to FIGS. 25 and 26, the operation of the document store name managing modules 512a and 541a will now be described.

If a plurality of document stores exist, it is necessary to manage the relations between indexes and document stores from which they are generated by the index generating section 512. In this embodiment, therefore, indexes are generated according to document stores, and the document store name managing module 512a adds information for specifying the corresponding document store to an index storing section in order to associate an index with the document store. As shown in FIG. 25, this enables to associate index storing sections with document stores.

As shown in FIG. 26, at search time the document store name managing module 541a inquires of index storing sections in turn to specify the index storing section which was generated from a document store in point. For example, if the document store 55a is selected as one to be searched on the screen shown in FIG. 8, the document store name managing module 541a inquires of indexes in turn to specify the index storing section 52a as one corresponding to the document store 55a.

Figure 27:
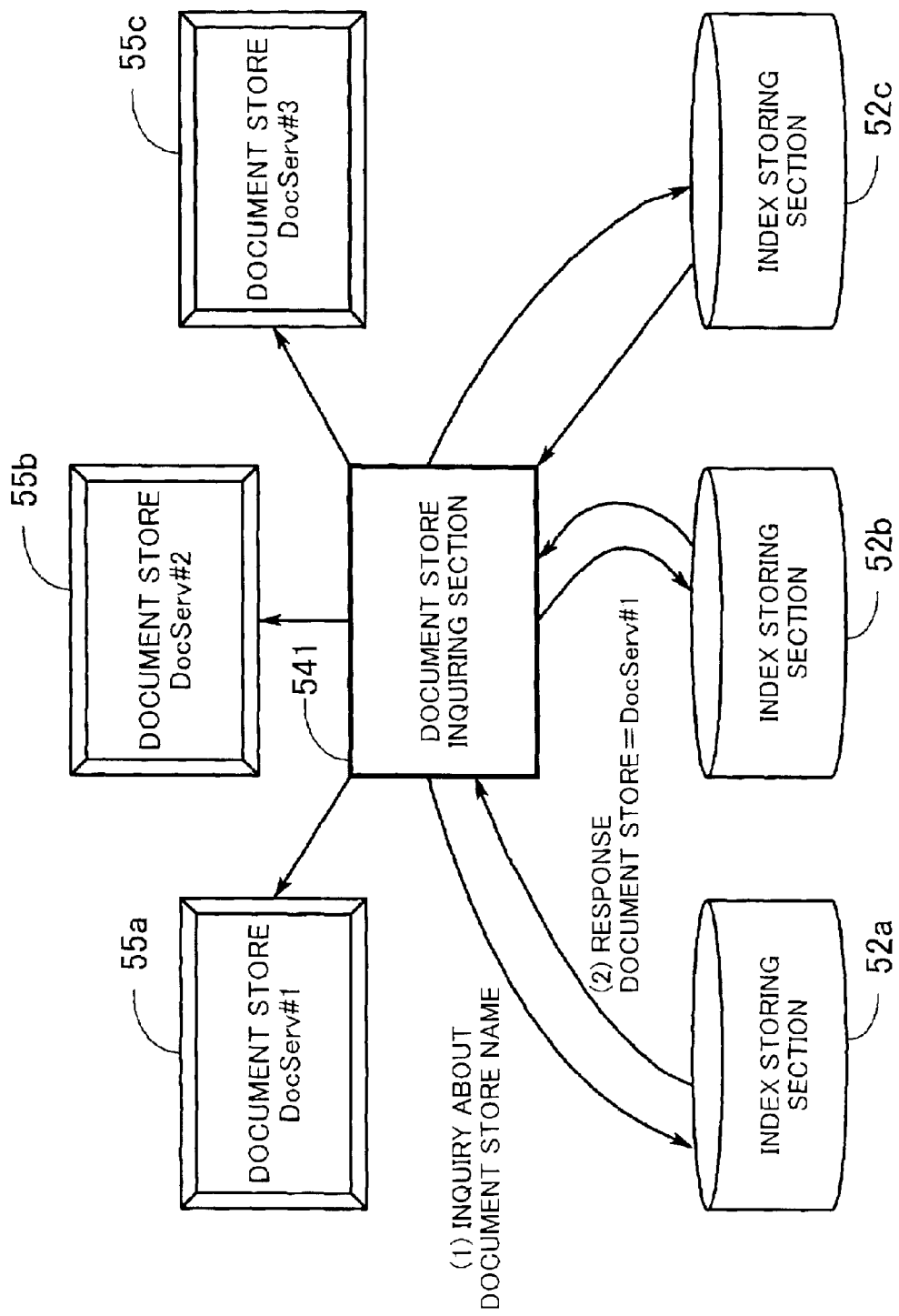
FIG. 27 is a view showing an example of the operation in the case of searching a plurality of document stores simultaneously.

A plurality of document stores can be searched simultaneously. In this case, each document store is searched and the sum of document sets obtained is generated, as shown in FIG. 27. As a result, a target document group can be obtained. In an example shown in FIG. 27, all of the document stores 55a through 55c are searched and search results obtained from the index storing sections 52a through 52c each corresponding to one of the document stores are synthesized into the final search result.

With reference to FIGS. 28 through 31, the operation of the multiple document store simultaneous treating modules 512c and 542a will now be described.

If a plurality of document stores exist, these modules manage the correspondences of the document stores to indexes. This is the same with the above case. In the above case, index storing sections were created according to document stores, but, in this example, one index storing section will be created for a plurality of document stores.

Figure 28:
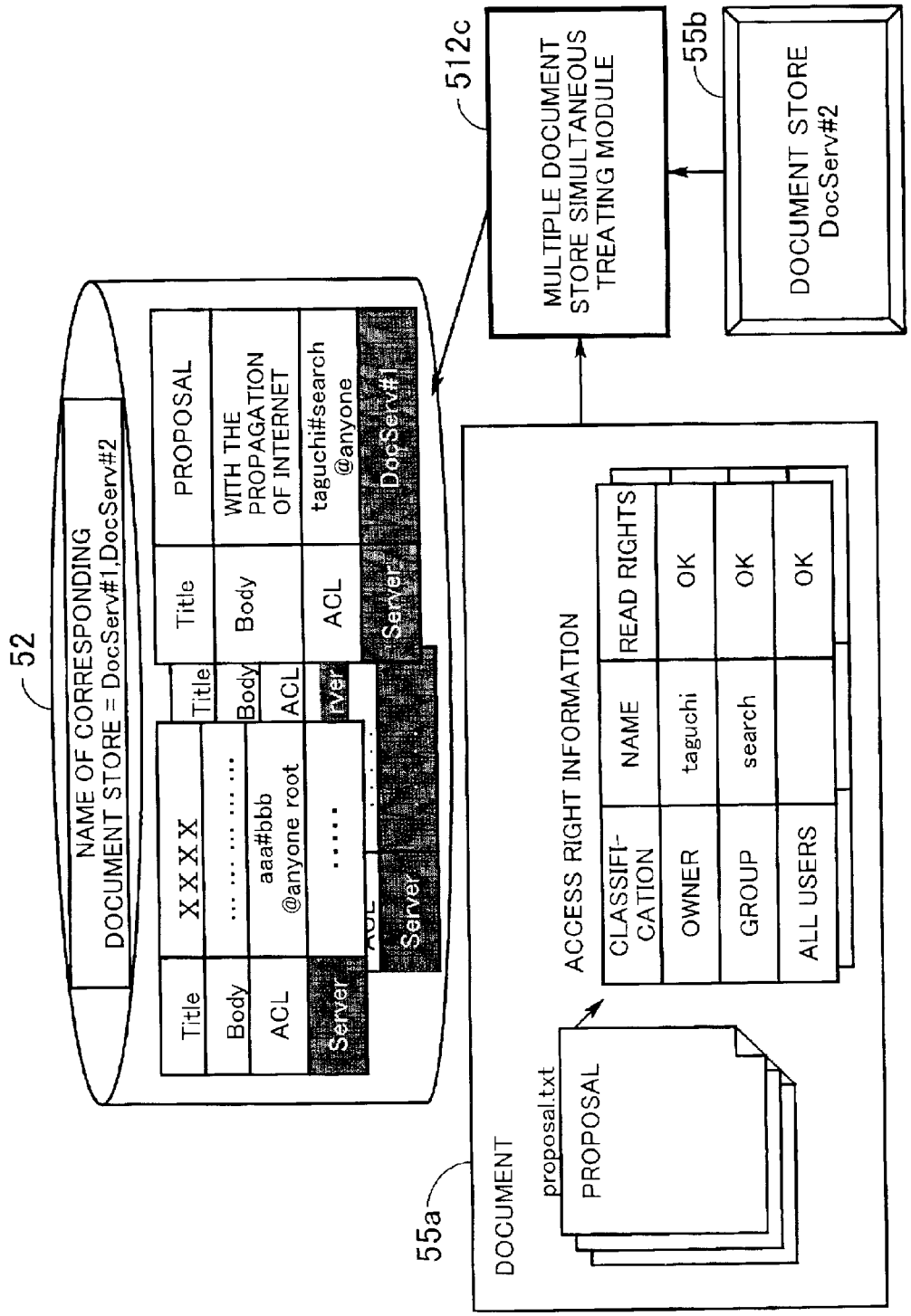
FIG. 28 is a view showing an example of the operation of a multiple document store simultaneous treating module.

As shown in FIG. 28, in this embodiment, indexes generated from the document stores 55a and 55b are stored in the same index storing section 52. In this case, the multiple document store simultaneous treating modules 512c gives the indexes information for specifying their original document stores. In this example, item "Server" is added to each index and information for specifying its original document store is stored in this item. Moreover, the corresponding document store names "DocServ#1" and "DocServ#2" are given to the index storing section 52.

Figure 29:
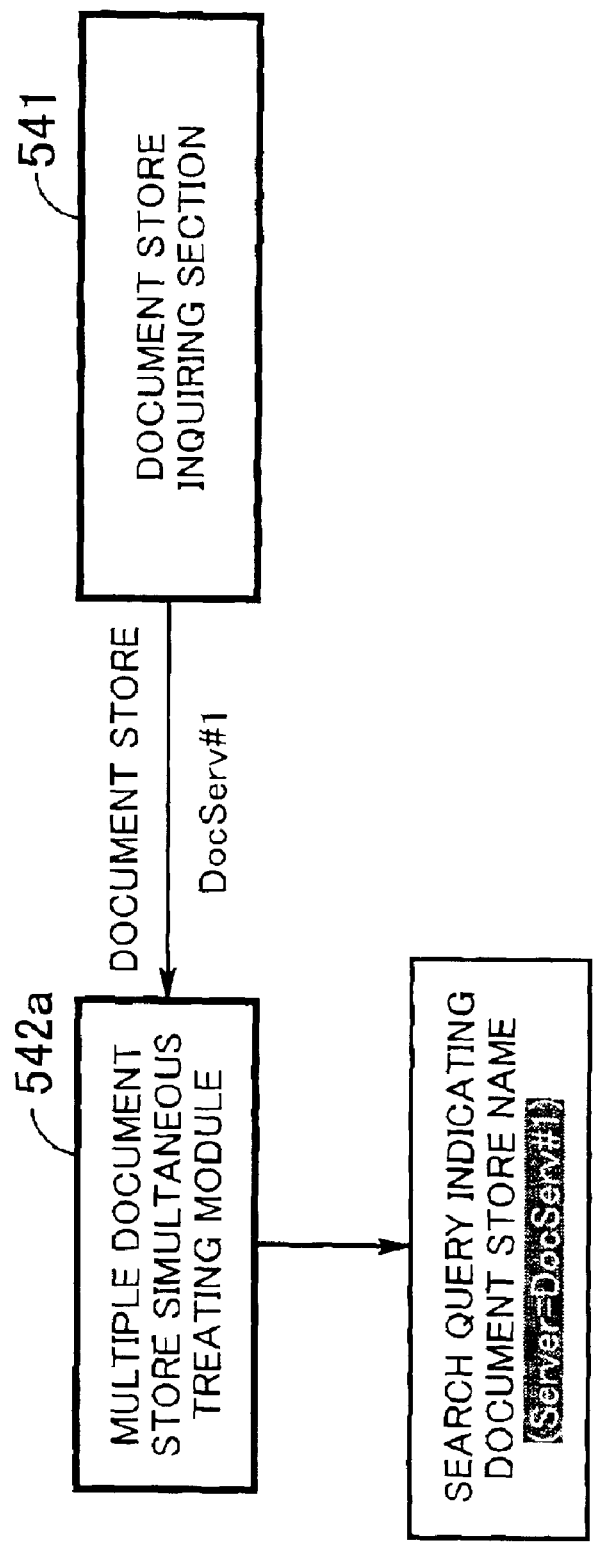
FIG. 29 is a view showing an example of the operation of a multiple document store simultaneous treating module.
Figure 30:
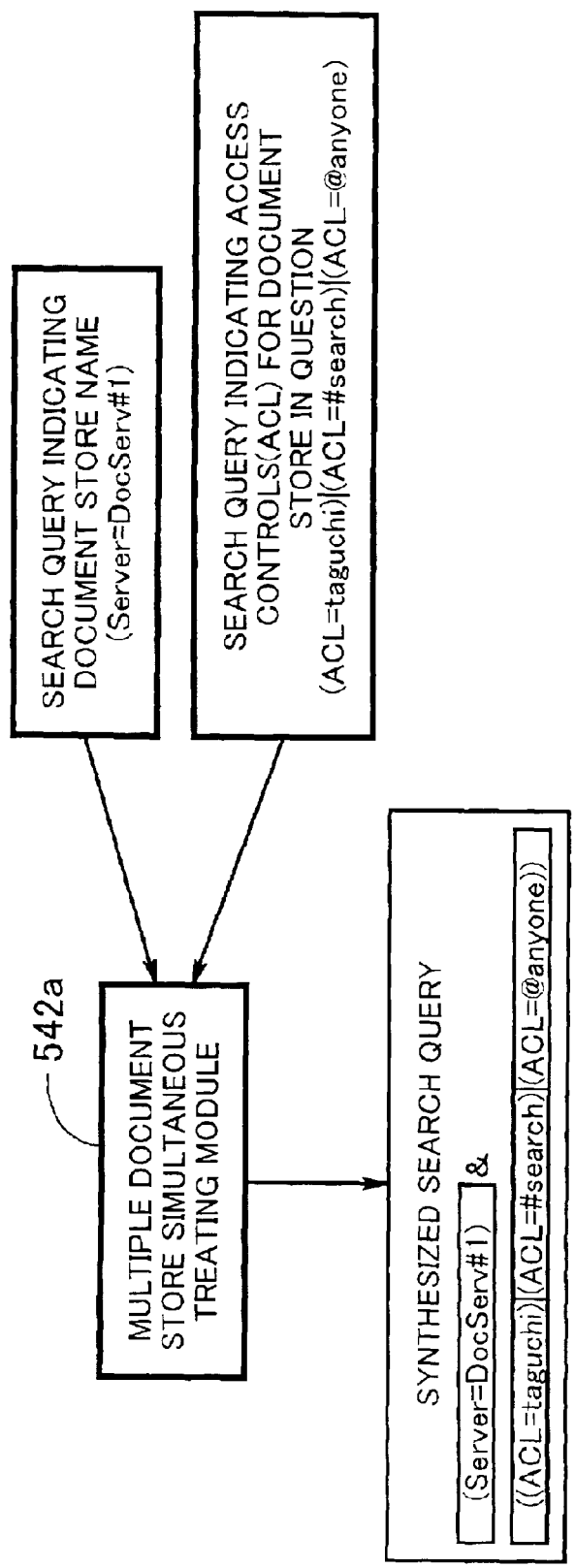
FIG. 30 is a view showing an example of the operation of a multiple document store simultaneous treating module.

FIGS. 29 and 30 are views for describing operation for searching by the use of an index generated in the above way.

As shown in FIG. 29, the multiple document store simultaneous treating module 542a generates search query (Server=DocServ#1) for making a document store name supplied from the document store inquiring section 541 a search condition.

The multiple document store simultaneous treating module 542a generates search query (Server=DocServ#1) for making a document store name supplied from the document store name managing module 541a a search condition.

Next, as shown in FIG. 30, the multiple document store simultaneous treating module 542a synthesizes a conditional expression indicating a document store and a conditional expression indicating access rights to generate an access control(ACL) expression for narrowing down access rights and a document store. In this example, conditional expression indicating a document store (Server=DocServ#1) and conditional expression indicating access rights (ACL=taguchi)|(ACL=#search)|(ACL=@anyone) are synthesized to generate (Server=DocServ#1)&((ACL=taguchi)|(ACL=#search)| (ACL=@anyone)).

A plurality of document stores can be searched simultaneously. In this case, an objective conditional expression is obtained by synthesizing search queries each corresponding to a document store by a logical add symbol, as shown in FIG. 31.

Figure 31:
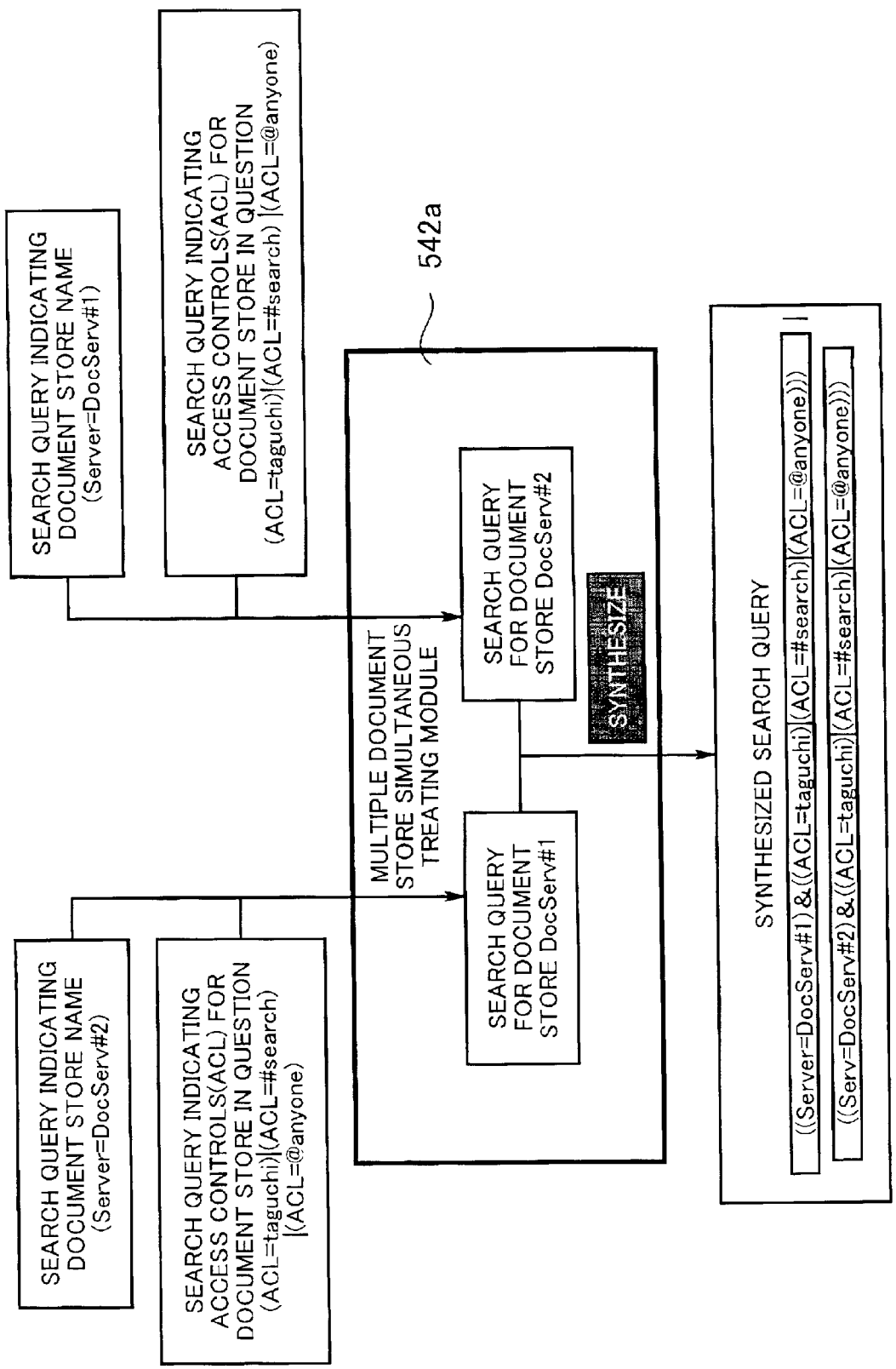
FIG. 31 is a view showing an example of the operation of a multiple document store simultaneous treating module.

In an example shown in FIG. 31, search query (Server=DocServ#1)&((ACL=taguchi)|(ACL=#search)|(ACL=@anyone )) for the document store 55a and search query (Server=DocServ#2)&((ACL=taguchi)|(ACL=#search)| (ACL=@anyone )) for the document store 55b are combined by a logical add symbol to generate objective search query ((Server=DocServ#1)&((ACL=taguchi)|(ACL=#search)| (ACL=@anyon e)))|((Server=DocServ#2)&((ACL= taguchi)|(ACL=#search)|(ACL=@anyone))).

In the above embodiment, even if there exist a plurality of target document stores, a document can be searched for.

With reference to FIGS. 32 through 35, the operation of the access right managing modules 511a, 512b, and 541b will now be described.

In order to treat a plurality of document stores which differ in method for managing access rights, it is necessary to manage access methods according to document stores. In this embodiment, therefore, an access method etc. for each document store are managed by the access right managing modules 511a, 512b, and 541b.

First, the operation of the access right managing module 511a will be described with reference to FIG. 32.

Figure 32:
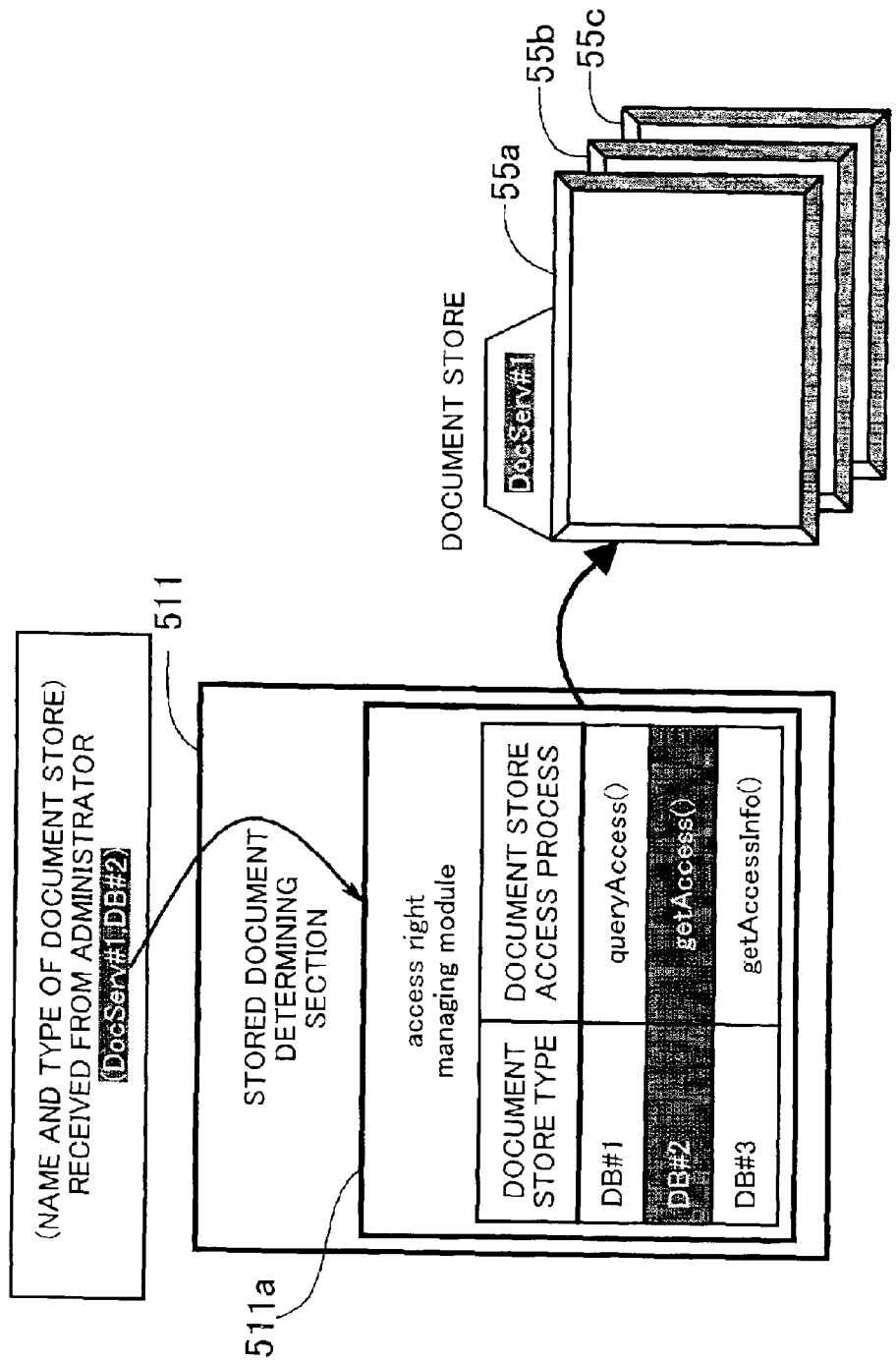
FIG. 32 is a view showing an example of the operation of an access right managing module.

As shown in FIG. 32, the access right managing module 511a stores the type of a document store and a method for accessing it by associating them. For example, a document store the type of which is "DB#1" is accessed by the use of access instruction "queryAccess( )".

The name and type of a target document store are passed from an administrator when an index is generated. The access right managing module 511a searches for an access instruction corresponding to the type of the document store which it received, and obtains access right information from the target document store in compliance with this instruction. Methods for accessing respective document stores are unitarily managed in this way, so even if a plurality of document stores which are different are connected, a searching process can be performed smoothly.

Figure 33:
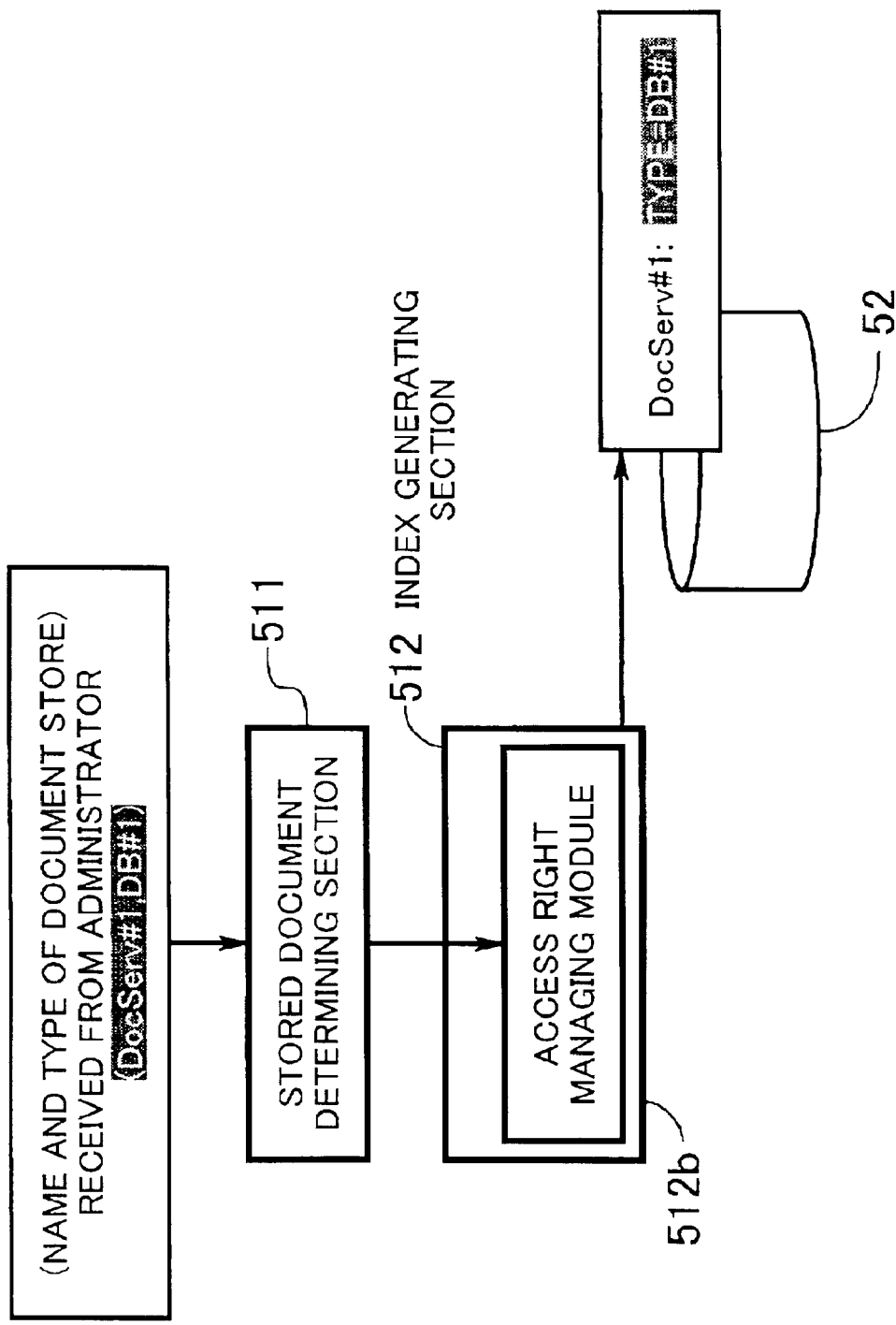
FIG. 33 is a view showing an example of the operation of an access right managing module.

With reference to FIG. 33, the operation of the access right managing module 512b will now be described.

As shown in FIG. 33, the access right managing module 512b adds information for specifying the type of a document store to an index when it is generated.

As a result, if the original document store is referred to on the basis of an index obtained as a search result, referring to this information stored in the index will make it easy to know a method for accessing the objective document store. A user therefore does not need to input the type of a document store, resulting in a smoother searching process.

Figure 34:
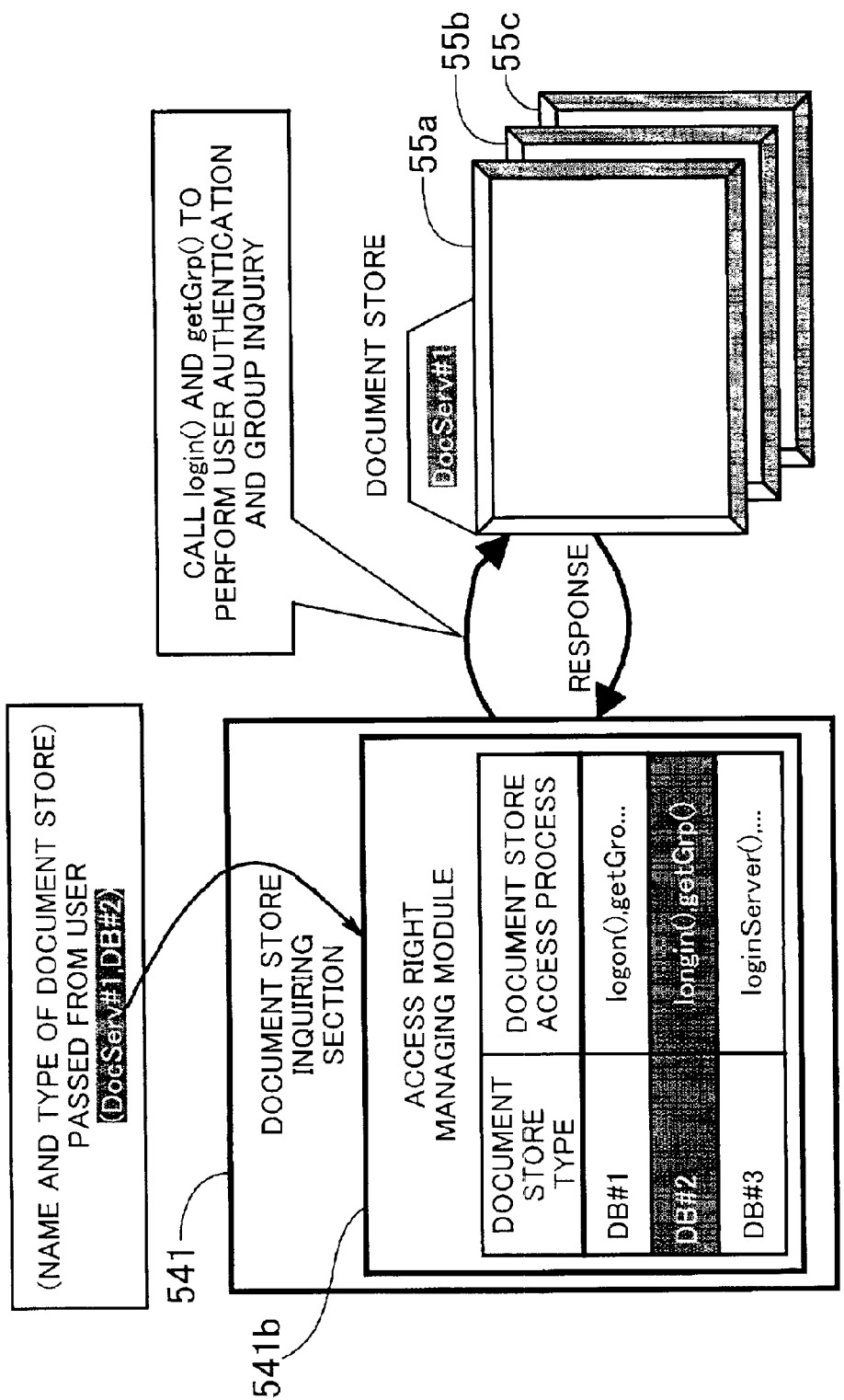
FIG. 34 is a view showing an example of the operation of an access right managing module.
Figure 35:
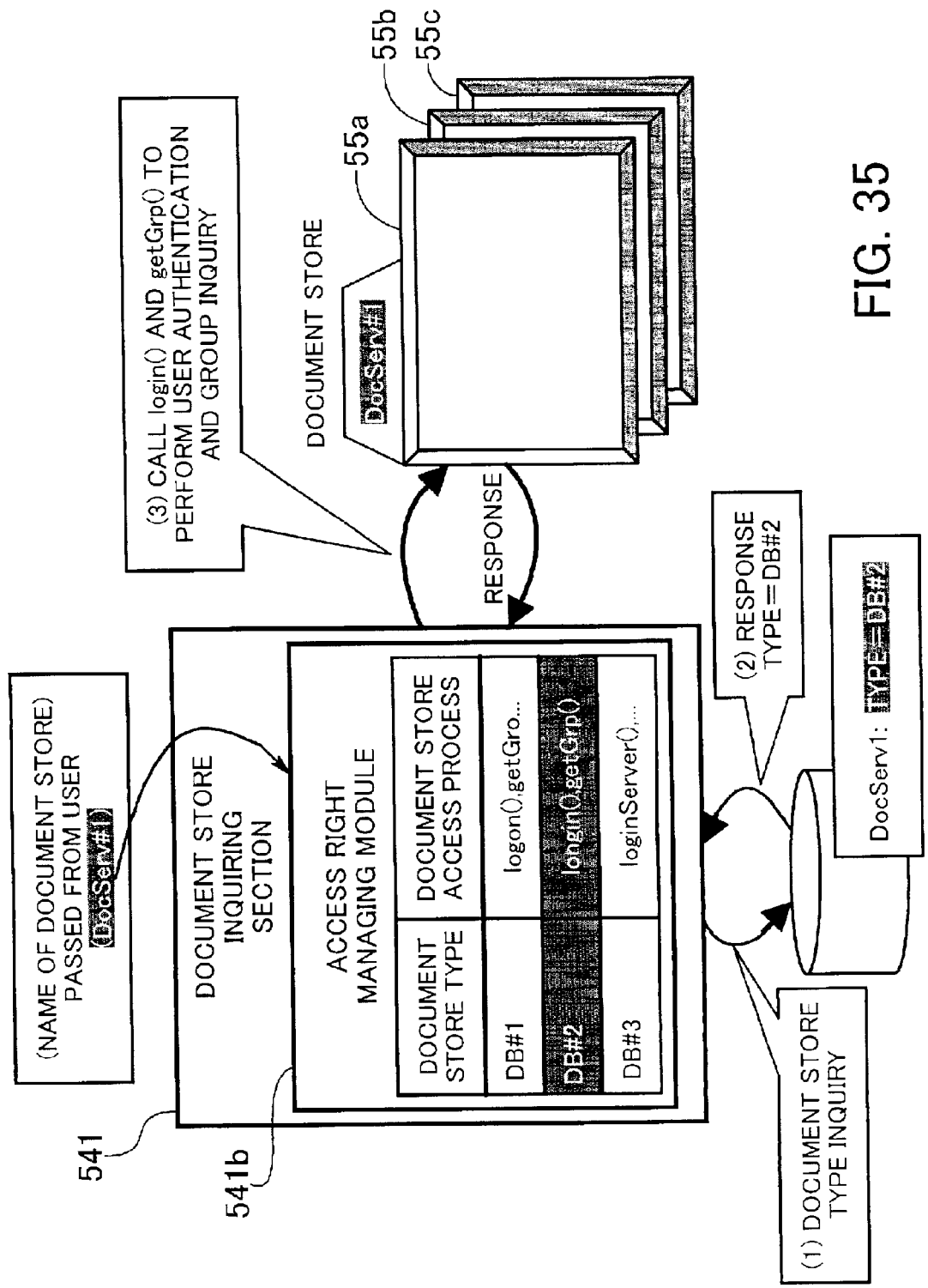
FIG. 35 is a view showing an example of the operation of an access right managing module.

With reference to FIGS. 34 and 35, the operation of the access right managing module 541b will now be described.

An embodiment shown in FIG. 34 shows an easy way of obtaining a method for accessing a document store by referring to information stored in the access right managing module 541b in the case of the document store being inquired of whether or not a user who accessed is a normal user.

In this example, when a user inputs the name and type of a document store to be searched, the access right managing module 541b obtains an access instruction for a document store of a type specified and inquires of the target document store in compliance with this instruction whether or not this user is a normal user.

Even if there exist a plurality of document stores which differ in access method, a user can search in this way without feeling the difference.

With reference to FIG. 35, a method for obtaining an access instruction without inputting the type of a document store will now be described.

In an embodiment shown in FIG. 35, information indicating the type of a document store is stored in an index. When a user requests authentication, the access right managing module 541b therefore refers to an index corresponding to the document store and specifies the type of the objective document store on the basis of information indicating its type stored in the index.

Then the access right managing module 541b obtains an access instruction corresponding to that type, accesses the objective document store in compliance with the access instruction, and performs authentication.

In the above embodiment, even if there exist document stores which differ in access method, user authentication etc. can be performed smoothly.

Figure 36:
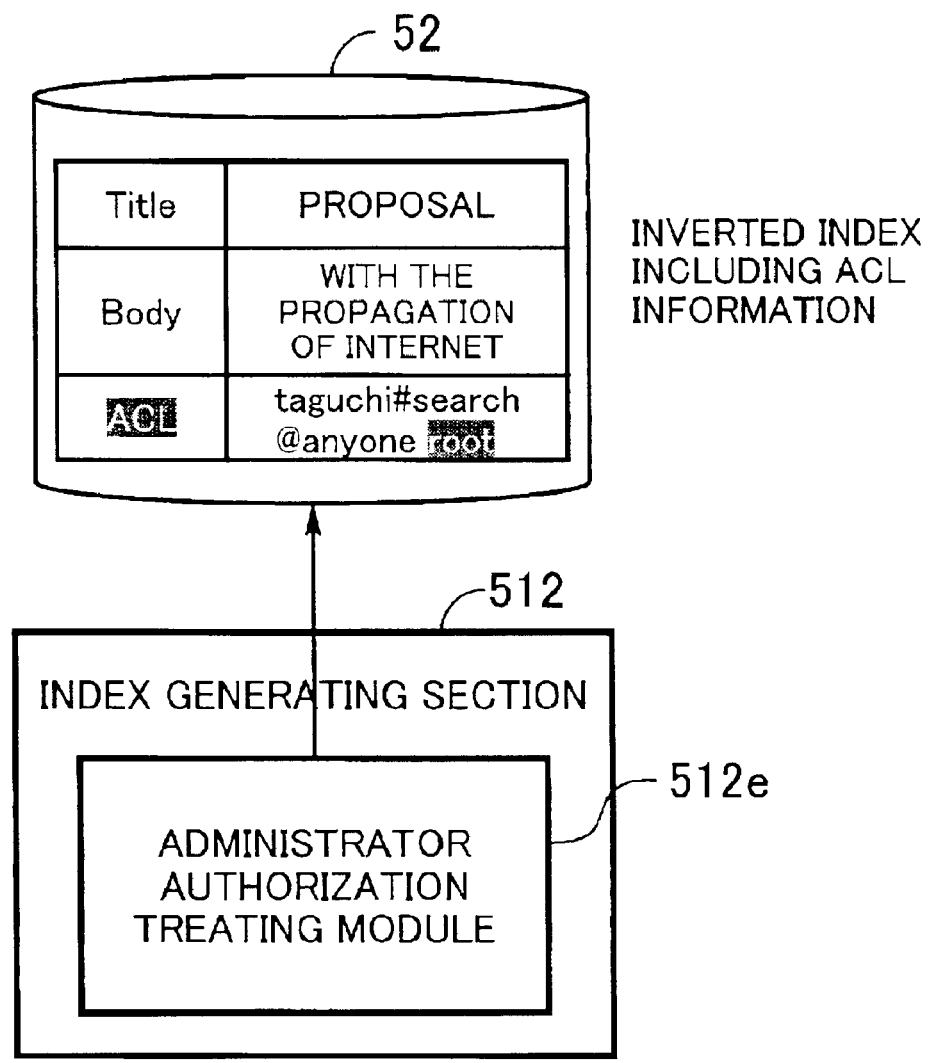
FIG. 36 is a view showing an example of the operation of an administrator authorization treating module.

With reference to FIGS. 36 and 37, the operation of the administrator authorization treating modules 512e and 543b will now be described.

If only documents for which a user has access rights are displayed as search results in the above way and the same condition is imposed on an administrator, the management of documents cannot be performed smoothly. In an embodiment of the present invention, therefore, an administrator shall have access rights for all documents.

FIG. 36 is a view for describing the operation of the administrator authorization treating module 512e. As shown in FIG. 36, the administrator authorization treating module 512e stores "root," indicating an administrator, in ACLs of all indexes when they are generated. This enables administrator "root" to refer to all documents by the use of a search query including (ACL=root) when he/she logs in.

Figures 37A, 37B:
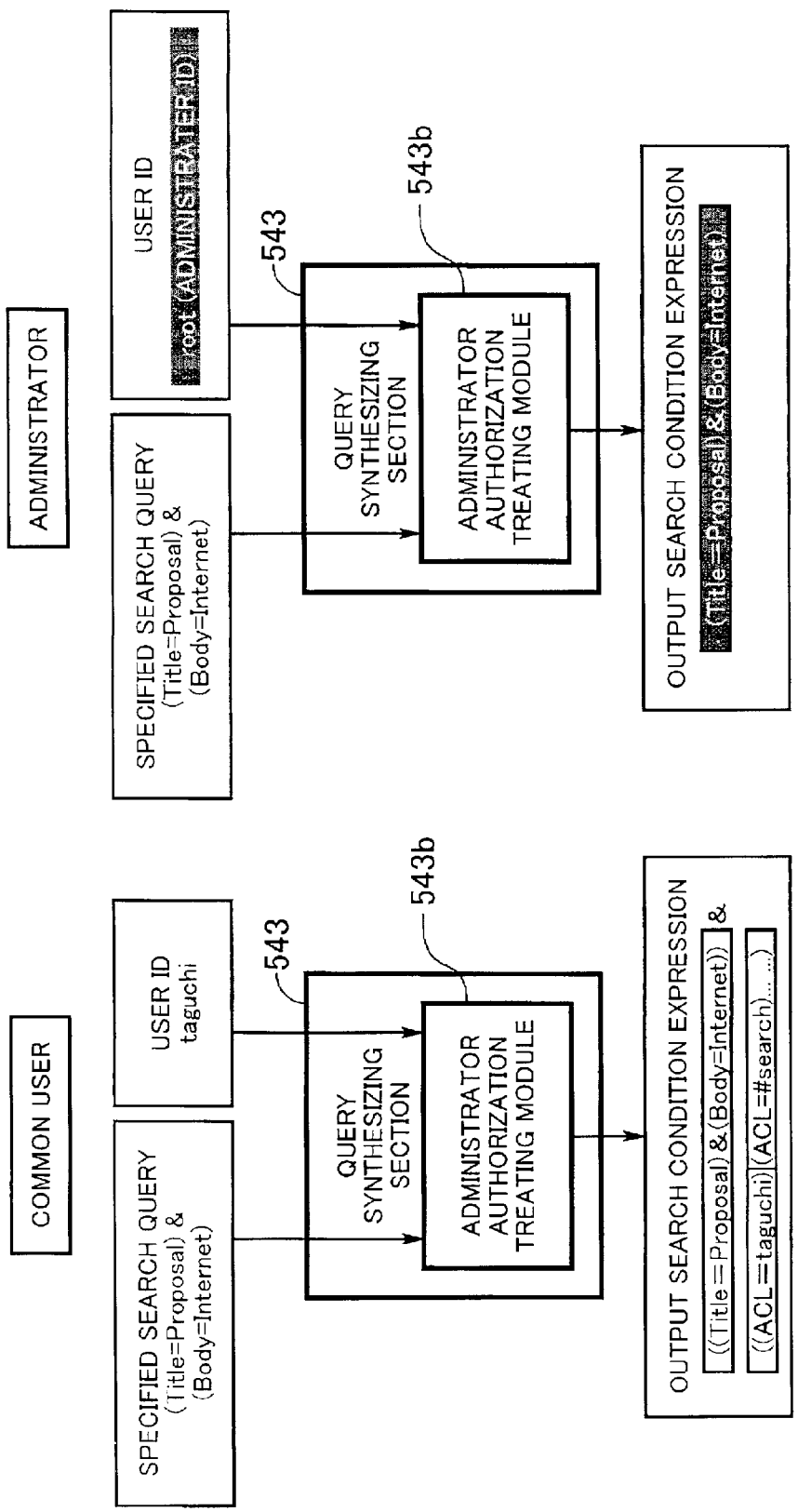
FIGS. 37(A) and 37(B) are views showing an example of the operation of an administrator authorization treating module.

FIGS. 37(A) and 37(B) show an embodiment being different from the one in FIG. 36. In this example, the administrator authorization treating module 543b generates queries which differ between a common user and an administrator. Unlike the above case, particular information is not added to an index.

That is to say, as shown in FIG. 37(A), a search query including access rights is generated for a common user, as is the same as the above case. As shown in FIG. 37(B), on the other hand, a search query including only input conditions is generated for an administrator. This expression does not include conditions concerning access rights.

This enables an administrator who accesses to search for all documents, resulting in smooth document management.

With reference to FIGS. 38(A) through 40, the operation of the access right management on/off switching module 512d will now be described.

The limitation of access to all or part of document stores may need to be stopped according to using environments. In this embodiment, the access right management on/off switching module 512d performs a process for coping with such a case.

Figures 38A, 38B:
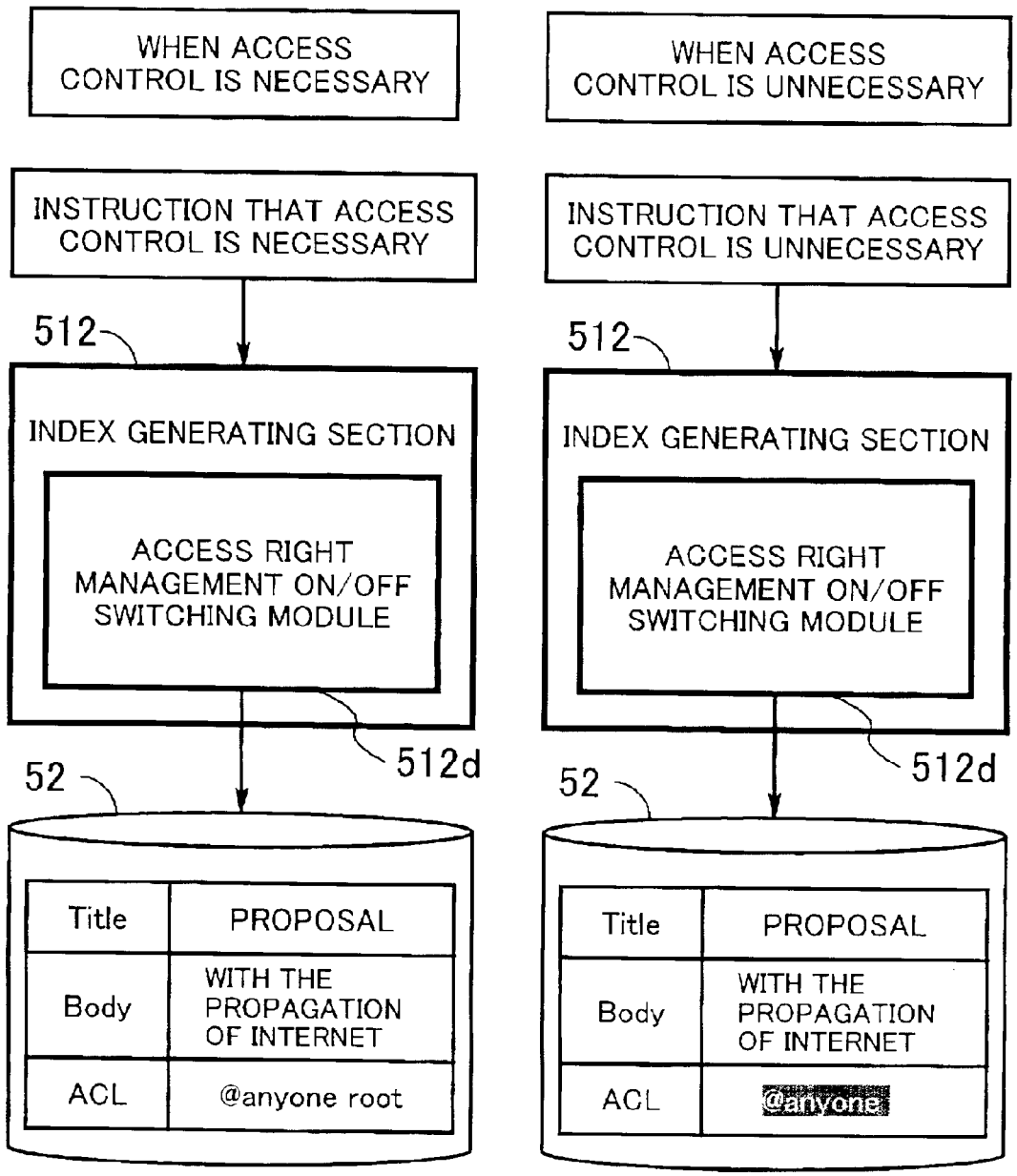
FIGS. 38(A) and 38(B) are views showing an example of the operation of an access right management on/off switching module.

FIGS. 38(A) and 37(B) are views for describing an example of the operation of the access right management on/off switching module 512d.

As shown in FIG. 38(A), the access right management on/off switching module 512d generates an index for a document store access to which needs to be limited, as is the same as the above case.

As shown in FIG. 38(B), on the other hand, the access right management on/off switching module 512*d* stores "@anyone," indicating that all users can access, in ACL of an index which it generates for a document store access to which does not need to be limited.

As a result, anyone can access a document store access to which does not need to be limited.

Figures 39A, 39B:
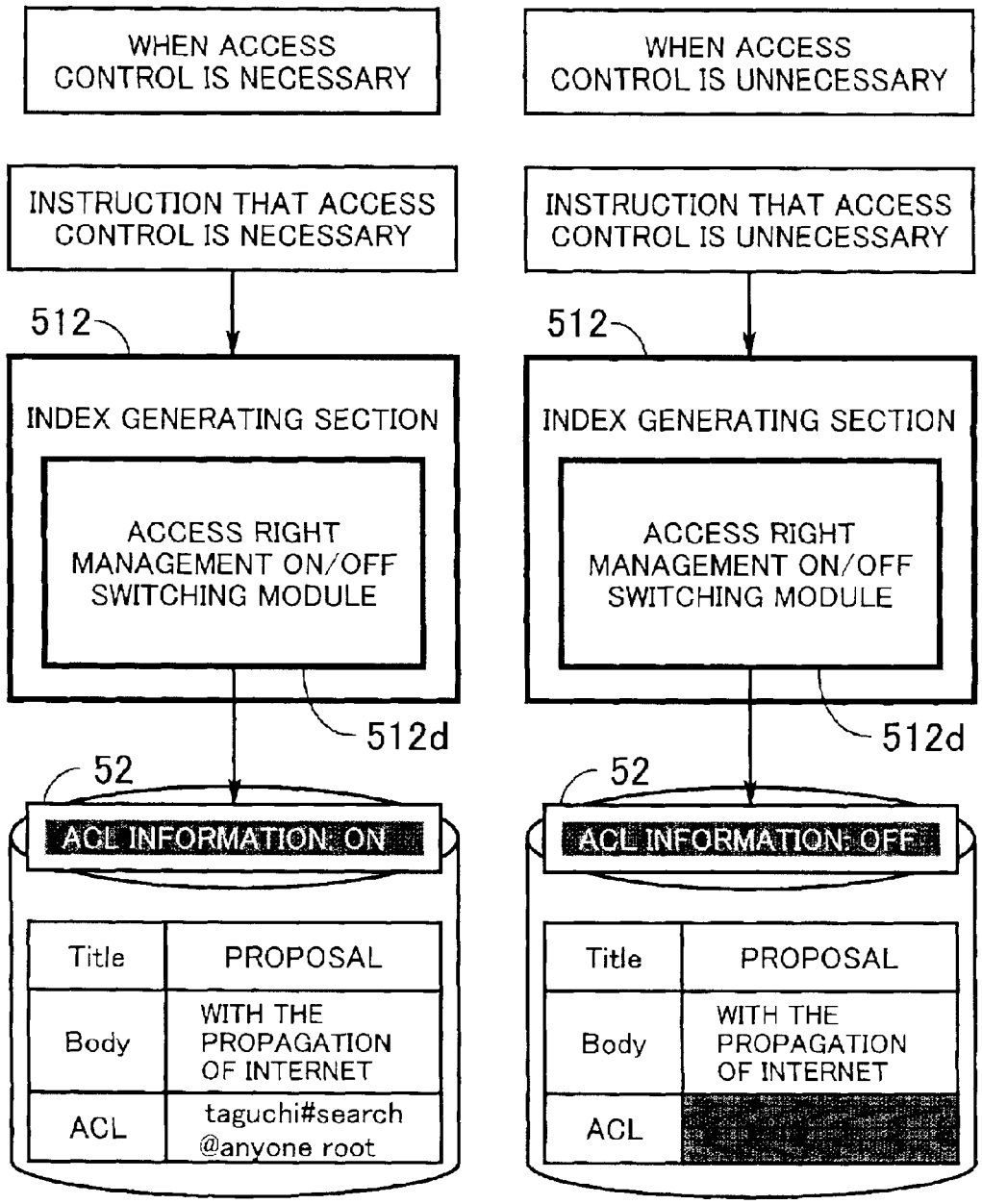
FIGS. 39(A) and 39(B) are views showing an example of the operation of an access right management on/off switching module.
Figure 40:
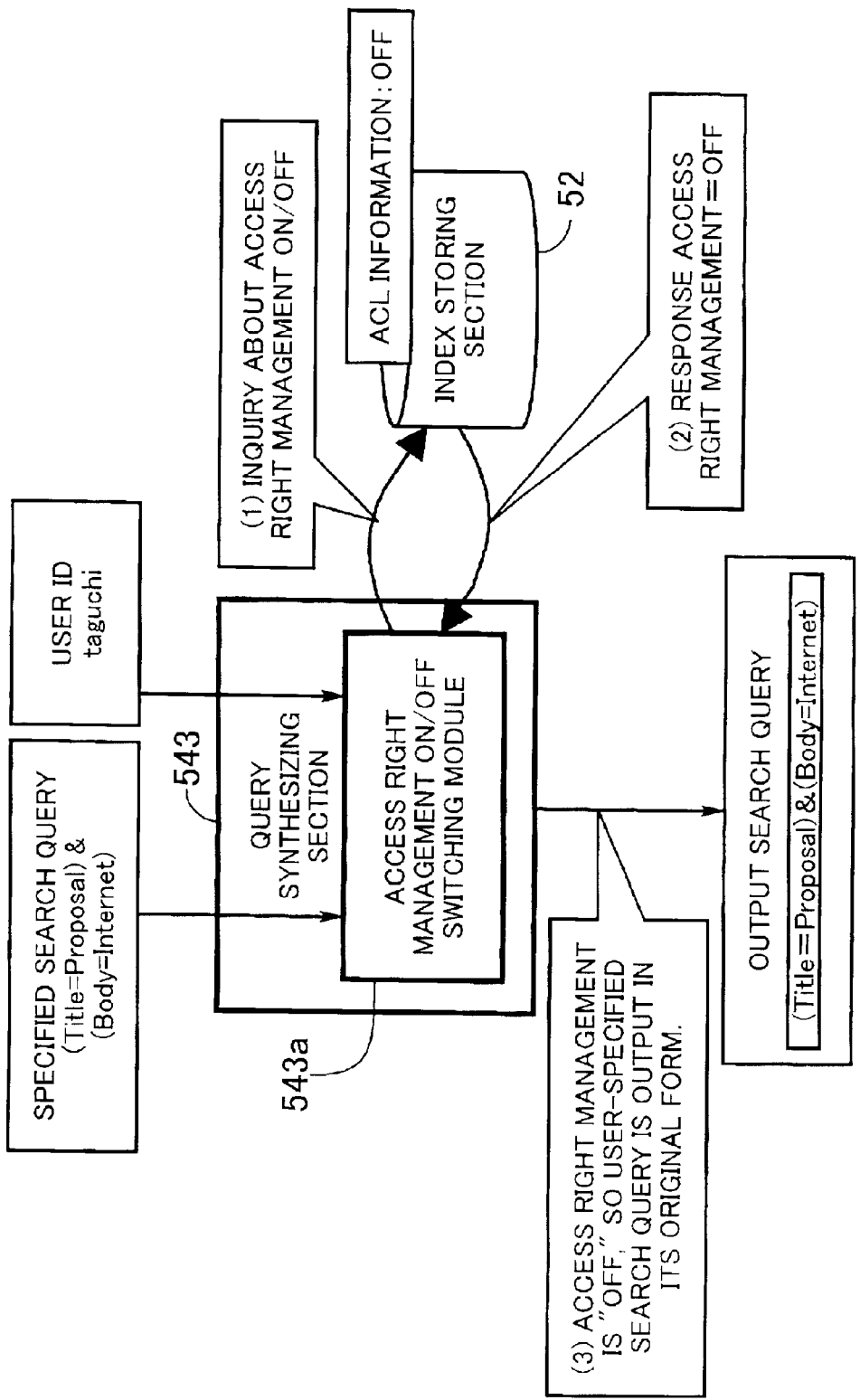
FIG. 40 is a view showing an example of the operation of an access right management on/off switching module.

With reference to FIGS. 39(A), 39(B) and 40, a method for stopping the limitation of access, being different from the one shown in FIGS. 38(A) and (B), will now be described.

In an example shown in FIGS. 39(A) and 38(B), if an administrator gives the instruction that access to a predetermined document store does not need to be limited, the access right management on/off switching module 512*d* adds information indicating that the limitation of access is stopped to the corresponding index storing section. In this example, if access is limited, then information given to the index storing section 52 is set to "ON" state (FIG. 39(A)); if the limitation of access is stopped, then information given to the index storing section 52 is set to "OFF" state (FIG. 39(B)).

With reference to FIG. 40, an example of a searching process reflecting information set in this way will now be described.

When a conditional expression and user ID are supplied from a user, the access right management on/off switching module 543*a* inquires whether or not information given to the corresponding index storing section 52 is "ON". If it is "ON," then a search query including access rights is generated as usual; if it is "OFF," then the input conditional expression is output in its original form. In an example shown in FIG. 40, access rights are "OFF," so input conditional expression (Title=Proposal&(Body=Internet) is output in its original form.

In the above embodiment, the limitation of access by creating access rights can be stopped or used at need. The limitation of access therefore can be used properly according to purposes.

Figure 41:
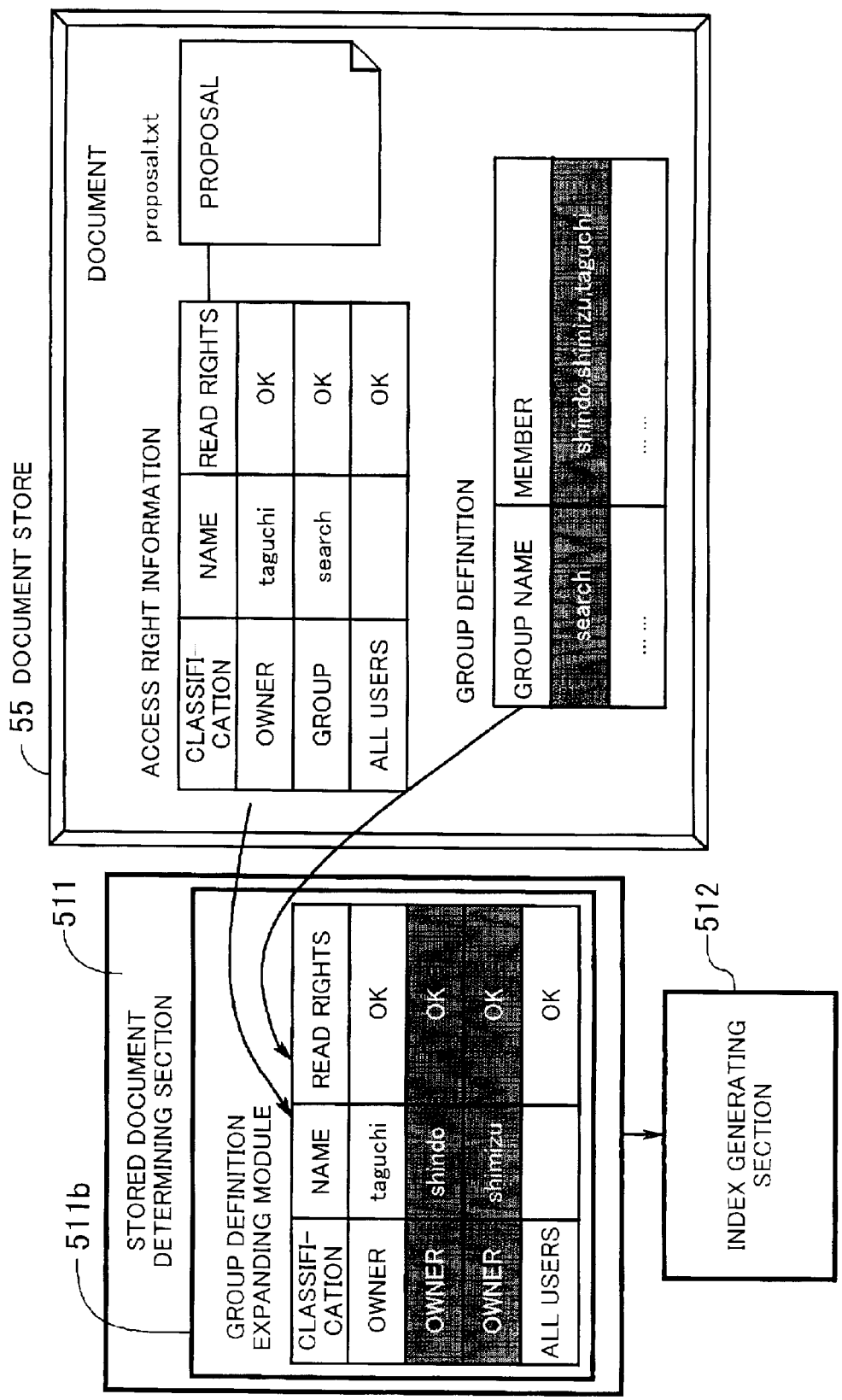
FIG. 41 is a view showing an example of the operation of a group definition expanding module.
Figure 42:
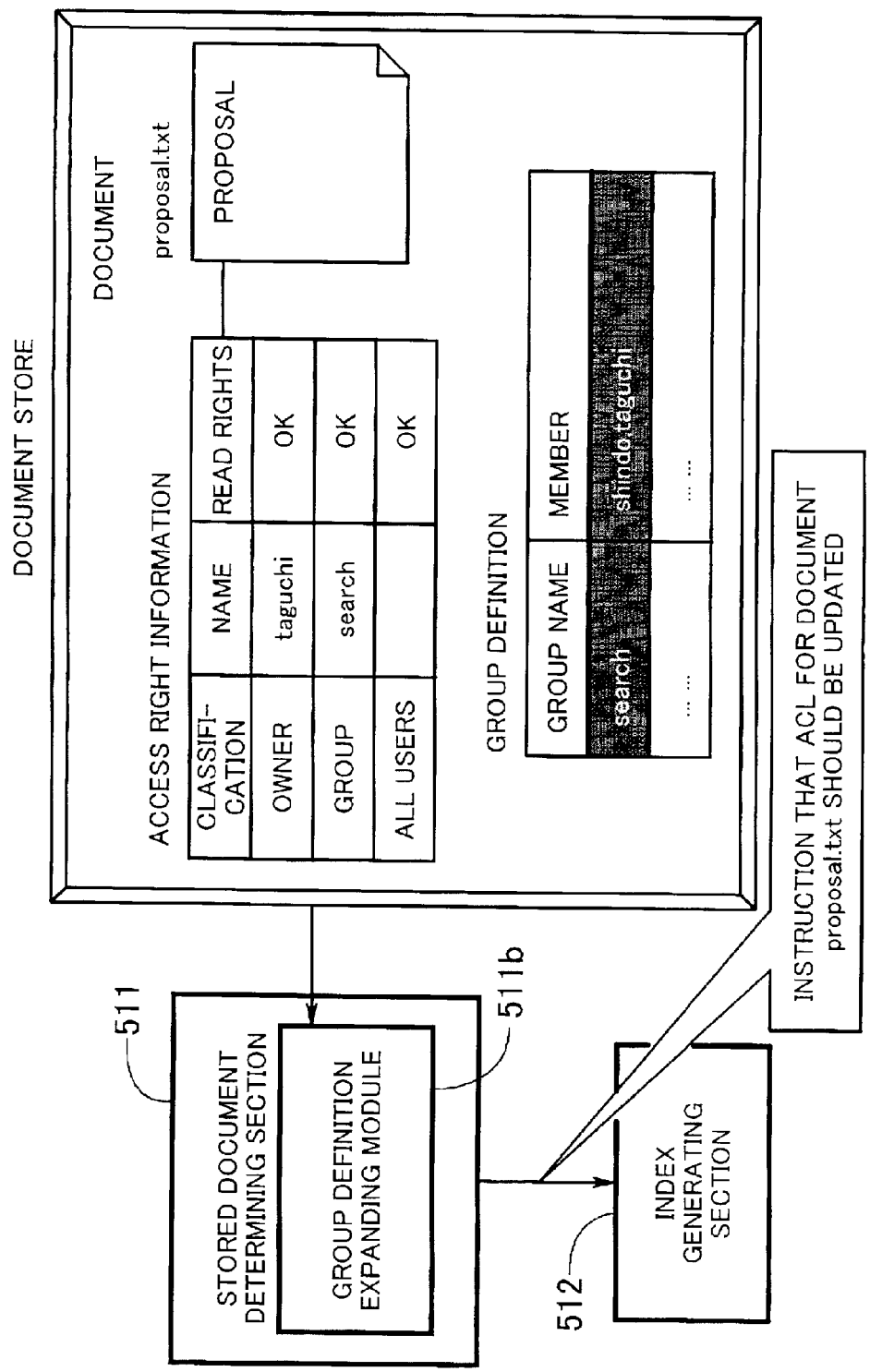
FIG. 42 is a view showing an example of the operation of a group definition expanding module.
Figure 43:
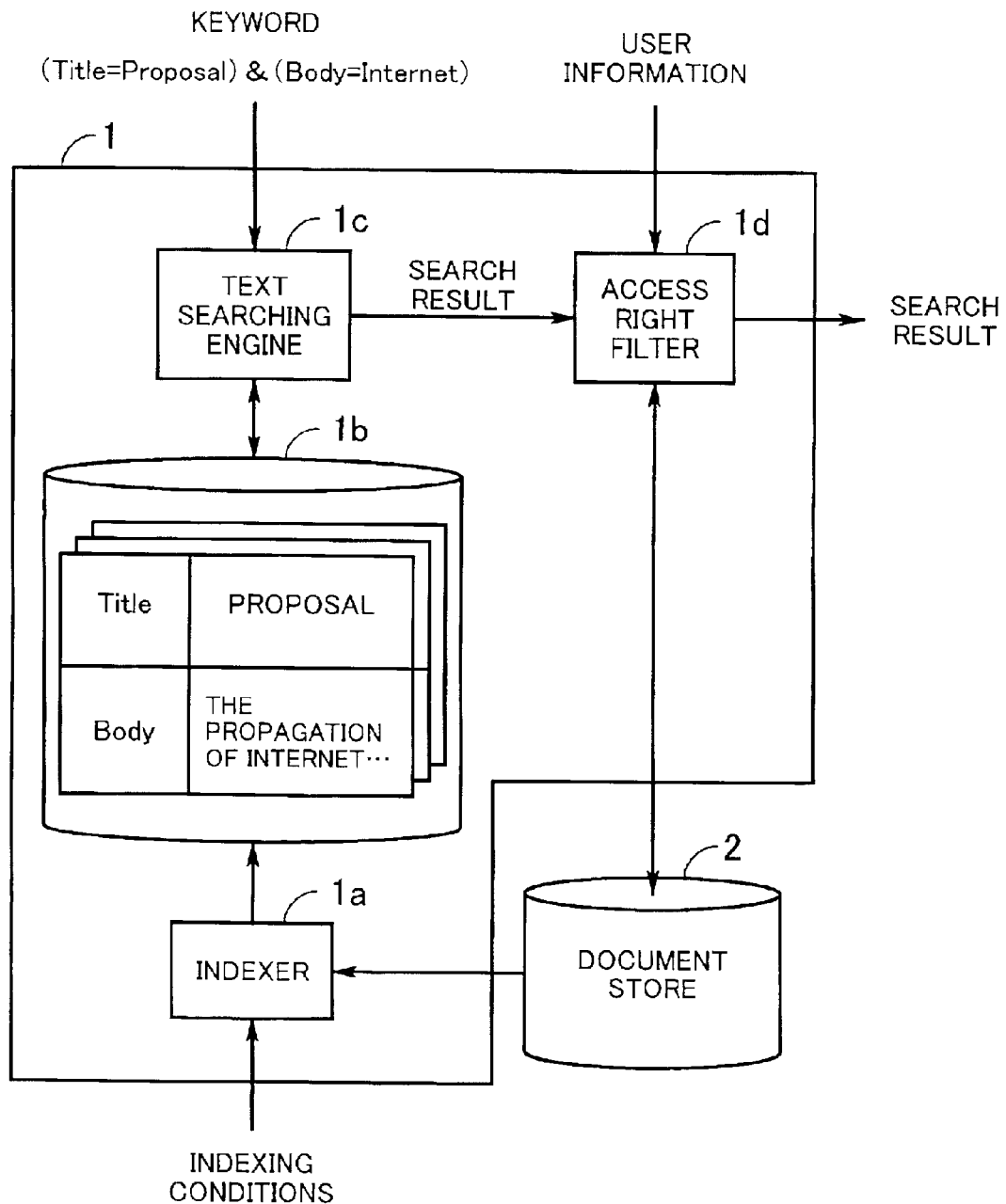
FIG. 43 is a view showing an example of a conventional information processing apparatus.

With reference to FIGS. 41 and 42, the operation of the group definition expanding module 511*b* will now be described.

In the methods which have been described, it is necessary to inquire at search time which group a user who searches belongs to. A method for improving searching speed by saving inquiring a group at search time will now be described.

The group definition expanding module 511*b* sets access right information in an index in compliance with a group definition at the time of the index being generated.

FIG. 41 is a view for describing operation for generating an index. As shown in FIG. 41, when an index is generated, the group definition expanding module 511*b* refers to definition information concerning a group, which is permitted to access, in a document store and adds the user IDs of all members who make up the group to ACL of the index.

As a result, in ACL of an index corresponding to a document which a group is permitted to access, the user IDs of all members who belong to the group will be enumerated. In this embodiment, there is no need to inquire a group, which enables to improve searching speed.

With reference to FIG. 42, a process performed when an index generated in the above way is updated will now be described.

A group definition is not constant. Information concerning a group definition changes with time. Therefore, it is necessary to cope with a change in group definition. When a group definition is changed, the group definition expanding module 511*b* specifies a document which the group is permitted to access, and changes information in ACL of the index in compliance with a new group definition. In an example shown in FIG. 42, "shimizu" is excluded from among the members who make up group "search," compared to the example shown in FIG. 41. In this case, "shimizu" will be excluded from indexes for all documents for which access rights are given to group "search".

In the above embodiment, even if a group definition changes, access permission can be given only to proper users.

As stated above, in the present invention, right information is given to an index and is also included in a search query at search time. Therefore, even if right information is added, high-speed search can be performed.

In the above embodiments the correspondence of a document store to a memory is one-to-one, but one document store may be stored dispersedly in a plurality of memories.

Furthermore, in the above embodiments a document including text was given as an example of objects to be searched for, but information consisting of, for example, an image or computer data alone can be searched for, of course.

Finally the above procedure can be achieved with a computer. In that case, the contents of a function which an information processing apparatus must have are described in a program recorded on a record medium which can be read with a computer. The above procedure is achieved with a computer by executing this program on the computer. A record medium which can be read with a computer can be a magnetic recording medium, a semiconductor memory, or the like. In order to place this program on the market, it can be stored on a portable record medium, such as a compact disk read only memory (CD-ROM) or a floppy disk. Alternatively, it can be stored in a memory of a computer connected via a network and be transferred to another computer via a network. When this program is executed on a computer, it is stored on a hard disk etc. in the computer and is loaded into a main memory.

As described above, an information processing apparatus for performing a process for searching for a file stored in a memory according to the present invention comprises file information obtaining means for obtaining predetermined information from a file, right information obtaining means for obtaining right information indicating a user who can access a file, index storing means for storing an index in which information obtained by the file information obtaining means is associated with right information obtained by the right information obtaining means, keyword inputting means for accepting keyword input for searching for a file, user specifying means for specifying a user who input a keyword, search query generating means for generating a search query from a keyword input from the keyword inputting means and information indicating a user specified by the user specifying means, and searching means for searching the index storing means for an index corresponding to a search query generated by the search query generating means. A file therefore can be searched for with right information added.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information processing apparatus for performing a process for searching for a file stored in a memory, the apparatus comprising:

file information obtaining means for obtaining predetermined information from the file;

right information obtaining means for obtaining right information indicating a user who can access the file;

index storing means for storing an index in which information obtained by the file information obtaining means is associated with right information obtained by the right information obtaining means;

keyword inputting means for accepting keyword input for searching for the file;

user specifying means for specifying a user who input the keyword;

search query generating means for generating a search query from a keyword input from the keyword inputting means and information indicating a user specified by the user specifying means; and searching means for searching the index storing means for an index corresponding to a search query generated by the search query generating means, wherein the memory has hierarchy structure and right information is set for each hierarchy, further wherein the right information obtaining means makes a synthesis of right information regarding a hierarchy higher than the hierarchy in which a file to be obtained is stored and right information regarding the file right information regarding the file.

2. The information processing apparatus according to claim 1, wherein the user specifying means specifies a user by referring to a user ID and password input when the user logs in.

3. The information processing apparatus according to claim 1, wherein the right information obtaining means updates right information regarding a corresponding index stored in the index storing means when right information regarding the file is changed.

4. The information processing apparatus according to claim 1, further comprising procedure storing means for storing procedures for obtaining information from the memory, wherein procedures stored in the procedure storing means are referred to in order to obtain predetermined information from the memory.

5. The information processing apparatus according to claim 1, wherein the right information includes information for giving access rights to a group consisting of a plurality of users.

6. The information processing apparatus according to claim 5, wherein if access rights for a file are given to a predetermined group, the index storing means stores information for specifying all users making up the group by associating this information with a corresponding index.

7. The information processing apparatus according to claim 1, wherein the right information includes information for giving access rights to all users.

8. The information processing apparatus according to claim 1,
wherein the index storing means stores a plurality of indexes generated from a file store, being a set of files stored in one or more memories, as a group of indexes regarding the file store, further wherein the searching means searches a corresponding group of indexes when information for specifying the file store is input from the keyword inputting means.

9. The information processing apparatus according to claim 8, wherein when a plurality of file stores are searched, the searching means makes the sum of results obtained by searching each of the file stores objective search results.

10. The information processing apparatus according to claim 1,
wherein the index storing means stores a plurality of indexes generated from a plurality of file stores as a group of indexes regarding these file stores, further wherein the searching means searches a corresponding group of indexes when information for specifying the file store is input from the keyword inputting means.

11. The information processing apparatus according to claim 10,
wherein the index storing means also stores information for specifying a corresponding file store by associating, further wherein when information for specifying a predetermined file store is input from the keyword inputting means, the search query generating means generates a search query including information for specifying the file store, further wherein the searching means searches a corresponding index by collating information stored in the index storing means for specifying a corresponding file store with information included in a search query for specifying a file store.

12. The information processing apparatus according to claim 11, wherein the search query generating means makes the logical sum of a search query for each file store an objective search query when a plurality of file stores are searched.

13. The information processing apparatus according to claim 1, wherein the index storing means gives predetermined right information to all indexes so that a particular user can search for all files.

14. The information processing apparatus according to claim 1, wherein the search query generating means generates a search query not including the information indicating a user regarding a particular user.

15. The information processing apparatus according to claim 1, wherein when a new index is generated, the index storing means stores an index access to which does not need to be limited with right information for permitting all users to access given.

16. The information processing apparatus according to claim 1,
wherein the index storing means gives a group of indexes access to which does not need to be limited an identification sign indicating to that effect, further wherein when a group of indexes with the identification sign are searched, the search query generating means generates a search query not including the information indicating a user.

17. A computer-readable record medium recording a computer program for performing a process for searching for a file stored in a memory, the program comprising the functions of:

file information obtaining means for obtaining predetermined information from the file;

right information obtaining means for obtaining right information indicating a user who can access the file;

index storing means for storing an index in which information obtained by the file information obtaining means is associated with right information obtained by the right information obtaining means;

keyword inputting means for accepting keyword input for searching for the file;

user specifying means for specifying a user who input the keyword;

search query generating means for generating a search query from a keyword input from the keyword inputting means and information indicating a user specified by the user specifying means; and searching means for searching the index storing means for an index corresponding to a search query generated by the search query generating means, wherein the memory has hierarchy structure and right information is set for each hierarchy, further wherein the right information obtaining means makes a synthesis of right information regarding a hierarchy higher than the hierarchy in which a file to be obtained is stored and right information regarding the file right information regarding the file.

* * * * *